United States Patent
Dinan

(10) Patent No.: US 10,085,165 B2
(45) Date of Patent: *Sep. 25, 2018

(54) MULTI-CELL SIGNALS IN OFDM WIRELESS NETWORKS

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 187 days.

This patent is subject to a terminal disclaimer.

(21) Appl. No.: 14/797,095

(22) Filed: Jul. 11, 2015

(65) Prior Publication Data

US 2015/0327108 A1    Nov. 12, 2015

Related U.S. Application Data

(63) Continuation of application No. 14/620,429, filed on Feb. 12, 2015, now Pat. No. 9,100,958, which is a
(Continued)

(51) Int. Cl.
*H04W 24/10* (2009.01)
*H04B 7/06* (2006.01)
(Continued)

(52) U.S. Cl.
CPC ............ *H04W 24/10* (2013.01); *H04B 7/066* (2013.01); *H04B 7/0626* (2013.01);
(Continued)

(58) Field of Classification Search
CPC ..... H04W 24/10; H04W 72/04; H04W 16/28; H04W 28/16; H04W 5/001; H04B 7/04; H04L 27/2602; H04L 5/0057
See application file for complete search history.

(56) References Cited

U.S. PATENT DOCUMENTS 6,314,305 B1    11/2001    Solondz et al.
7,693,100 B2    4/2010    Cho et al.
(Continued)

FOREIGN PATENT DOCUMENTS

EP    2858265 A1    4/2015
JP    2010178237 A    8/2010
(Continued)

OTHER PUBLICATIONS

3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10), pp. 1-98 dated 2010.
(Continued)

*Primary Examiner* — Mewale Ambaye
(74) *Attorney, Agent, or Firm* — Banner & Witcoff, Ltd.

(57) ABSTRACT

A wireless device receives messages indicating CSI measurement resources of cells belonging to at least two base stations or belonging to at least two sectors of a base station. The wireless device measures CSI employing at least CSI measurement resources of the cells. The wireless device quantizes the measured CSI jointly across cells and encodes and transmits the jointly quantized CSI. The wireless device receives a resource assignment for data packet(s). The wireless device receives signals carrying the data packets from multiple cells.

36 Claims, 7 Drawing Sheets

Related U.S. Application Data continuation of application No. 14/561,300, filed on Dec. 5, 2014, now Pat. No. 8,971,316, which is a continuation of application No. 14/294,902, filed on Jun. 3, 2014, now Pat. No. 8,908,679, which is a continuation of application No. 13/624,889, filed on Sep. 22, 2012, now Pat. No. 8,797,966.

(60) Provisional application No. 61/538,683, filed on Sep. 23, 2011.

(51) Int. Cl.
- H04L 5/00 (2006.01)
- H04W 72/04 (2009.01)
- H04W 24/08 (2009.01)
- H04J 11/00 (2006.01)

(52) U.S. Cl.
CPC ......... *H04B 7/0632* (2013.01); *H04B 7/0634* (2013.01); *H04J 11/0053* (2013.01); *H04L 5/00* (2013.01); *H04L 5/0032* (2013.01); *H04L 5/0053* (2013.01); *H04L 5/0057* (2013.01); *H04L 5/0073* (2013.01); *H04W 24/08* (2013.01); *H04W 72/042* (2013.01)

(56) References Cited

U.S. PATENT DOCUMENTS

| | | | |
|---|---|---|---|
| 7,724,722 B2 | 5/2010 | Seo et al. |
| 8,099,052 B2 | 1/2012 | Cho et al. |
| 8,265,629 B2 | 9/2012 | Kwon et al. |
| 8,280,444 B1 | 10/2012 | Shen et al. |
| 8,369,788 B2 | 2/2013 | Kim et al. |
| 8,385,452 B2 | 2/2013 | Gorokhov |
| 8,385,968 B2 | 2/2013 | Kim et al. |
| 8,427,976 B1 | 4/2013 | Dinan |
| 8,483,292 B2 | 7/2013 | Wang et al. |
| 8,488,440 B2 | 7/2013 | Venturino et al. |
| 8,526,459 B2 | 9/2013 | Dinan |
| 8,537,911 B2 | 9/2013 | Sayana et al. |
| 8,538,482 B2 | 9/2013 | Koo et al. |
| 8,565,333 B2 | 10/2013 | Seo et al. |
| 8,576,794 B1 | 11/2013 | Dinan |
| 8,583,134 B2 | 11/2013 | Hou et al. |
| 8,614,981 B2 | 12/2013 | Mallik et al. |
| 8,649,344 B2 | 2/2014 | Xu et al. |
| 8,681,651 B2 | 3/2014 | Bhattad et al. |
| 8,750,152 B2 | 6/2014 | Koo et al. |
| 8,750,251 B2 | 6/2014 | Shin et al. |
| 8,768,393 B2 | 7/2014 | Shirani-Mehr et al. |
| 8,774,850 B2 | 7/2014 | Koo et al. |
| 8,792,881 B2 | 7/2014 | Koo et al. |
| 8,797,966 B2 | 8/2014 | Dinan |
| 8,837,619 B2 | 9/2014 | Shin et al. |
| 8,838,164 B2 | 9/2014 | Koo et al. |
| 8,848,673 B2 | 9/2014 | Dinan |
| 8,879,496 B2 | 11/2014 | Dinan |
| 8,885,569 B2 | 11/2014 | Dinan |
| 8,908,679 B2 | 12/2014 | Dinan |
| 8,913,592 B2 | 12/2014 | Dinan |
| 8,913,593 B2 | 12/2014 | Dinan |
| 8,923,905 B2 | 12/2014 | Montojo et al. |
| 8,953,699 B2 | 2/2015 | Sayana et al. |
| 8,971,316 B1 | 3/2015 | Dinan |
| 8,983,397 B2 | 3/2015 | Gorokhov |
| 8,995,300 B2 | 3/2015 | Dinan |
| 9,002,345 B2 | 4/2015 | Lee et al. |
| 9,008,582 B2 | 4/2015 | Barbieri et al. |
| 9,019,845 B2 | 4/2015 | Prakash et al. |
| 9,025,487 B2 | 5/2015 | Hugl et al. |
| 9,048,885 B2 | 6/2015 | Kim et al. |
| 9,077,503 B2 | 7/2015 | Ng |
| 9,100,958 B2 | 8/2015 | Dinan |
| 9,106,285 B1 | 8/2015 | Dinan |
| 9,112,556 B2 | 8/2015 | Dinan |
| 9,112,564 B2 | 8/2015 | Dinan |
| 9,113,388 B1 | 8/2015 | Dinan |
| 9,131,414 B1 | 9/2015 | Dinan |
| 9,450,656 B2 | 9/2016 | Dinan |
| 9,455,775 B2 | 9/2016 | Dinan |
| 9,680,544 B2 | 6/2017 | Dinan |
| 2005/0197124 A1 | 9/2005 | Kane et al. |
| 2005/0197126 A1 | 9/2005 | Kang et al. |
| 2005/0265436 A1* | 12/2005 | Suh ........ H04L 1/0026 375/221 |
| 2006/0155533 A1 | 7/2006 | Lin et al. |
| 2006/0276189 A1 | 12/2006 | Kiernan et al. |
| 2007/0249355 A1 | 10/2007 | Kang et al. |
| 2008/0037398 A1 | 2/2008 | Verschuren et al. |
| 2008/0132262 A1 | 6/2008 | Jung et al. |
| 2008/0192856 A1 | 8/2008 | Jongren et al. |
| 2008/0285667 A1 | 11/2008 | Mondal et al. |
| 2008/0304464 A1 | 12/2008 | Borkar et al. |
| 2009/0028112 A1 | 1/2009 | Attar et al. |
| 2009/0036124 A1 | 2/2009 | Kim et al. |
| 2009/0143089 A1 | 6/2009 | Ji et al. |
| 2009/0195455 A1 | 8/2009 | Kim et al. |
| 2009/0201861 A1 | 8/2009 | Kotecha |
| 2009/0201903 A1 | 8/2009 | Ghady et al. |
| 2009/0202015 A1 | 8/2009 | Kwon et al. |
| 2009/0252091 A1 | 10/2009 | Tang et al. |
| 2009/0304109 A1 | 12/2009 | Kotecha |
| 2010/0003986 A1 | 1/2010 | Chen |
| 2010/0019942 A1 | 1/2010 | Pletersek et al. |
| 2010/0035555 A1 | 2/2010 | Bala et al. |
| 2010/0048935 A1 | 2/2010 | Mijolovic et al. |
| 2010/0062904 A1 | 3/2010 | Crawford et al. |
| 2010/0064334 A1 | 3/2010 | Blackburn et al. |
| 2010/0065047 A1 | 3/2010 | Wang |
| 2010/0081913 A1 | 4/2010 | Cross et al. |
| 2010/0088511 A1 | 4/2010 | Tavernier et al. |
| 2010/0088512 A1 | 4/2010 | Schwartz et al. |
| 2010/0100572 A1 | 4/2010 | Schiller |
| 2010/0100578 A1 | 4/2010 | Dao et al. |
| 2010/0110526 A1 | 5/2010 | Chui |
| 2010/0123587 A1 | 5/2010 | Walls |
| 2010/0131341 A1 | 5/2010 | McKay et al. |
| 2010/0173659 A1 | 7/2010 | Shin et al. |
| 2010/0189002 A1 | 7/2010 | Choi et al. |
| 2010/0202348 A1 | 8/2010 | Sambhwani |
| 2010/0238913 A1 | 9/2010 | Xia et al. |
| 2010/0239037 A1 | 9/2010 | Tang et al. |
| 2010/0246490 A1 | 9/2010 | Lavi et al. |
| 2010/0285792 A1 | 11/2010 | Chen et al. |
| 2011/0033079 A1 | 2/2011 | Liou et al. |
| 2011/0035807 A1 | 2/2011 | Alberth et al. |
| 2011/0040303 A1 | 2/2011 | Iannotti |
| 2011/0041271 A1 | 2/2011 | Huang |
| 2011/0041972 A1 | 2/2011 | Kageyama |
| 2011/0044937 A1 | 2/2011 | Bell et al. |
| 2011/0048226 A1 | 3/2011 | Yagi et al. |
| 2011/0064158 A1 | 3/2011 | Li et al. |
| 2011/0069164 A1 | 3/2011 | Ozawa et al. |
| 2011/0079759 A1 | 4/2011 | Ojeda |
| 2011/0080964 A1 | 4/2011 | Shamsi et al. |
| 2011/0085507 A1 | 4/2011 | Jongren |
| 2011/0090976 A1 | 4/2011 | Kim et al. |
| 2011/0097999 A1 | 4/2011 | Hansen et al. |
| 2011/0103503 A1 | 5/2011 | Shin et al. |
| 2011/0135407 A1 | 6/2011 | Koga |
| 2011/0135408 A1 | 6/2011 | Saji |
| 2011/0170427 A1 | 7/2011 | Koivisto et al. |
| 2011/0176633 A1 | 7/2011 | Ojard et al. |
| 2011/0207487 A1 | 8/2011 | Yang et al. |
| 2011/0212684 A1 | 9/2011 | Nam et al. |
| 2011/0243098 A1 | 10/2011 | Koivisto et al. |
| 2011/0286341 A1 | 11/2011 | Sanayei et al. |
| 2011/0305223 A1 | 12/2011 | Koo et al. |
| 2012/0002568 A1 | 1/2012 | Tiirola et al. |
| 2012/0020230 A1* | 1/2012 | Chen ........ H04L 1/0028 370/252 |
| 2012/0033571 A1 | 2/2012 | Shimezawa et al. |
| 2012/0063500 A1 | 3/2012 | Wang et al. |

(56) References Cited

U.S. PATENT DOCUMENTS

| | | |
|---|---|---|
| 2012/0083282 A1 | 4/2012 | Choi |
| 2012/0089861 A1 | 4/2012 | Cardinell et al. |
| 2012/0093415 A1 | 4/2012 | Robinson et al. |
| 2012/0105936 A1 | 5/2012 | Tsuboi et al. |
| 2012/0113801 A1 | 5/2012 | Robinson |
| 2012/0113816 A1* | 5/2012 | Bhattad ............... H04L 5/0032 370/246 |
| 2012/0113830 A1 | 5/2012 | Zhu et al. |
| 2012/0130291 A1 | 5/2012 | Dillingham et al. |
| 2012/0236736 A1 | 9/2012 | Frank et al. |
| 2012/0269077 A1 | 10/2012 | Bazzi et al. |
| 2012/0270535 A1 | 10/2012 | Chen et al. |
| 2013/0008468 A1 | 1/2013 | Bertram et al. |
| 2013/0018051 A1 | 1/2013 | Singh et al. |
| 2013/0021925 A1 | 1/2013 | Yin et al. |
| 2013/0021929 A1 | 1/2013 | Kim |
| 2013/0038044 A1 | 2/2013 | Nagasawa et al. |
| 2013/0058307 A1 | 3/2013 | Kim et al. |
| 2013/0077513 A1 | 3/2013 | Ng et al. |
| 2013/0077514 A1 | 3/2013 | Dinan |
| 2013/0078991 A1 | 3/2013 | Nam |
| 2013/0087973 A1 | 4/2013 | Bettner |
| 2013/0100898 A1 | 4/2013 | Zhu et al. |
| 2013/0114524 A1 | 5/2013 | Sirotkin et al. |
| 2013/0114658 A1 | 5/2013 | Davydov et al. |
| 2013/0115999 A1 | 5/2013 | Sirotkin et al. |
| 2013/0122986 A1 | 5/2013 | Storm et al. |
| 2013/0124351 A1 | 5/2013 | Fisher |
| 2013/0125058 A1 | 5/2013 | Lee et al. |
| 2013/0136932 A1 | 5/2013 | Hassan et al. |
| 2013/0143618 A1 | 6/2013 | Seshadri |
| 2013/0148515 A1 | 6/2013 | Ribeiro et al. |
| 2013/0155891 A1 | 6/2013 | Dinan |
| 2013/0155897 A1 | 6/2013 | Ihm et al. |
| 2013/0155975 A1 | 6/2013 | Dinan |
| 2013/0156008 A1 | 6/2013 | Dinan |
| 2013/0156009 A1 | 6/2013 | Dinan |
| 2013/0156010 A1 | 6/2013 | Dinan |
| 2013/0201896 A1 | 8/2013 | Ono et al. |
| 2013/0208604 A1 | 8/2013 | Lee et al. |
| 2013/0223547 A1 | 8/2013 | Zhou et al. |
| 2013/0242921 A1 | 9/2013 | Kim et al. |
| 2013/0258897 A1 | 10/2013 | Park et al. |
| 2013/0272206 A1 | 10/2013 | Li et al. |
| 2013/0279403 A1 | 10/2013 | Takaoka et al. |
| 2013/0279424 A1 | 10/2013 | Lee et al. |
| 2013/0279455 A1 | 10/2013 | Park et al. |
| 2013/0294288 A1 | 11/2013 | Choi |
| 2013/0294385 A1 | 11/2013 | Dinan |
| 2013/0294393 A1 | 11/2013 | Park et al. |
| 2013/0301448 A1 | 11/2013 | Sayana et al. |
| 2013/0336152 A1 | 12/2013 | Zhu et al. |
| 2013/0343299 A1 | 12/2013 | Sayana et al. |
| 2013/0343317 A1 | 12/2013 | Etemad et al. |
| 2014/0003270 A1 | 1/2014 | Maltsev et al. |
| 2014/0005899 A1 | 1/2014 | Byers et al. |
| 2014/0009995 A1 | 1/2014 | Amarillo et al. |
| 2014/0010021 A1 | 1/2014 | Lee et al. |
| 2014/0016714 A1 | 1/2014 | Chen et al. |
| 2014/0023419 A1 | 1/2014 | Morgan |
| 2014/0026576 A1 | 1/2014 | Bonati et al. |
| 2014/0033657 A1 | 2/2014 | Cere' |
| 2014/0053331 A1 | 2/2014 | Andersen et al. |
| 2014/0060210 A1 | 3/2014 | Jeon et al. |
| 2014/0061449 A1 | 3/2014 | Tunheim et al. |
| 2014/0071943 A1 | 3/2014 | Lee et al. |
| 2014/0072185 A1 | 3/2014 | Dunlap et al. |
| 2014/0072904 A1 | 3/2014 | Takano et al. |
| 2014/0084024 A1 | 3/2014 | Benda et al. |
| 2014/0086114 A1 | 3/2014 | Ng |
| 2014/0099893 A1 | 4/2014 | Kheirkhahi et al. |
| 2014/0110922 A1 | 4/2014 | Uchida |
| 2014/0112184 A1 | 4/2014 | Chai |
| 2014/0116704 A1 | 5/2014 | Reddy et al. |
| 2014/0121391 A1 | 5/2014 | Murphy |
| 2014/0121830 A1 | 5/2014 | Gromley et al. |
| 2014/0123001 A1 | 5/2014 | M. et al. |
| 2014/0128968 A1 | 5/2014 | Benichou et al. |
| 2014/0136995 A1 | 5/2014 | Matas |
| 2014/0138300 A1 | 5/2014 | Wietham |
| 2014/0146113 A1 | 5/2014 | Shimizu et al. |
| 2014/0192757 A1 | 7/2014 | Lee et al. |
| 2014/0211684 A1 | 7/2014 | Liu et al. |
| 2014/0219143 A1 | 8/2014 | He et al. |
| 2014/0226746 A1 | 8/2014 | Ko et al. |
| 2014/0247749 A1 | 9/2014 | Kim et al. |
| 2014/0254708 A1 | 9/2014 | Seo et al. |
| 2014/0269591 A1 | 9/2014 | Dinan |
| 2014/0269596 A1 | 9/2014 | Kim et al. |
| 2014/0321306 A1 | 10/2014 | Nam et al. |
| 2014/0376485 A1 | 12/2014 | Lee et al. |
| 2015/0009538 A1 | 1/2015 | Ogawa et al. |
| 2015/0009946 A1 | 1/2015 | Dinan |
| 2015/0018030 A1 | 1/2015 | Park et al. |
| 2015/0023194 A1 | 1/2015 | Seo et al. |
| 2015/0030197 A1 | 1/2015 | Pavlov et al. |
| 2015/0031242 A1 | 1/2015 | Hasegawa et al. |
| 2015/0035556 A1 | 2/2015 | Kaltalioglu |
| 2015/0035760 A1 | 2/2015 | Wu et al. |
| 2015/0049698 A1 | 2/2015 | Liu et al. |
| 2015/0054669 A1 | 2/2015 | Okuyama |
| 2015/0055115 A1 | 2/2015 | Pedersen et al. |
| 2015/0063268 A1 | 3/2015 | Dinan |
| 2015/0063308 A1 | 3/2015 | Dinan |
| 2015/0063314 A1 | 3/2015 | Dinan |
| 2015/0063488 A1 | 3/2015 | Dinan |
| 2015/0065231 A1 | 3/2015 | Anderson et al. |
| 2015/0071202 A1 | 3/2015 | Liu et al. |
| 2015/0082696 A1 | 3/2015 | Barendregt et al. |
| 2015/0085693 A1 | 3/2015 | Dinan |
| 2015/0086445 A1 | 3/2015 | Lee et al. |
| 2015/0103764 A1 | 4/2015 | Deng et al. |
| 2015/0146561 A1 | 5/2015 | Jung et al. |
| 2015/0163775 A1 | 6/2015 | Dinan |
| 2015/0173064 A1 | 6/2015 | Kim et al. |
| 2015/0207546 A1 | 7/2015 | Dinan |
| 2015/0215090 A1 | 7/2015 | Sayana et al. |
| 2015/0237542 A1 | 8/2015 | Dinan |
| 2015/0237558 A1 | 8/2015 | Dinan |
| 2015/0319649 A1 | 11/2015 | Dinan |
| 2015/0372730 A1 | 12/2015 | Dinan |
| 2017/0034752 A1 | 2/2017 | Dinan |

FOREIGN PATENT DOCUMENTS

| | | |
|---|---|---|
| JP | 2010246113 A | 10/2010 |
| JP | 2012507203 A | 3/2012 |
| JP | 2014075676 A | 4/2014 |
| JP | 2014093620 A | 5/2014 |
| JP | 2014514837 A | 6/2014 |
| JP | 2014143734 A | 8/2014 |
| JP | 2014523200 A | 9/2014 |
| JP | 2014524718 A | 9/2014 |
| JP | 2014529945 A | 11/2014 |
| JP | 2014530580 A | 11/2014 |
| JP | 2014534667 A | 12/2014 |
| JP | 2014534769 A | 12/2014 |
| JP | 2014534771 A | 12/2014 |
| JP | 2015008530 A | 1/2015 |
| JP | 2015019394 A | 1/2015 |
| JP | 2015511078 A | 4/2015 |
| JP | 2015097329 A | 5/2015 |
| JP | 2015519019 A | 7/2015 |
| JP | 2015525525 A | 9/2015 |
| KR | 20080037398 A | 4/2008 |
| KR | 20100019942 A | 2/2010 |
| KR | 20100048935 A | 5/2010 |
| KR | 100964438 B1 | 6/2010 |
| KR | 20100062904 A | 6/2010 |
| KR | 20100064334 A | 6/2010 |
| KR | 20100065047 A | 6/2010 |
| KR | 20100081913 A | 7/2010 |
| KR | 20100088511 A | 8/2010 |
| KR | 20100088512 A | 8/2010 |

(56) References Cited

FOREIGN PATENT DOCUMENTS

| | | |
|---|---|---|
| KR | 20100100572 A | 9/2010 |
| KR | 20100100578 A | 9/2010 |
| KR | 20100110526 A | 10/2010 |
| KR | 20100123587 A | 11/2010 |
| KR | 20100131341 A | 12/2010 |
| KR | 20110033079 A | 3/2011 |
| KR | 20110035807 A | 4/2011 |
| KR | 20110040303 A | 4/2011 |
| KR | 20110041271 A | 4/2011 |
| KR | 20110041972 A | 4/2011 |
| KR | 20110044937 A | 5/2011 |
| KR | 20110048226 A | 5/2011 |
| KR | 20110069164 A | 6/2011 |
| KR | 20110079759 A | 7/2011 |
| KR | 20110097999 A | 8/2011 |
| KR | 20110135407 A | 12/2011 |
| KR | 20110135408 A | 12/2011 |
| KR | 20120061881 A | 6/2012 |
| KR | 20120089861 A | 8/2012 |
| KR | 20120093415 A | 8/2012 |
| KR | 20120105936 A | 9/2012 |
| KR | 20120113801 A | 10/2012 |
| KR | 20120130291 A | 11/2012 |
| KR | 20130008468 A | 1/2013 |
| KR | 20130018051 A | 2/2013 |
| KR | 20130038044 A | 4/2013 |
| KR | 20130087973 A | 8/2013 |
| KR | 20130122986 A | 11/2013 |
| KR | 20130124351 A | 11/2013 |
| KR | 20130125058 A | 11/2013 |
| KR | 20130136932 A | 12/2013 |
| KR | 20130143618 A | 12/2013 |
| KR | 20140005899 A | 1/2014 |
| KR | 20140009995 A | 1/2014 |
| KR | 20140010021 A | 1/2014 |
| KR | 20140023419 A | 2/2014 |
| KR | 20140026576 A | 3/2014 |
| KR | 20140033657 A | 3/2014 |
| KR | 20140053331 A | 5/2014 |
| KR | 20140060210 A | 5/2014 |
| KR | 20140061449 A | 5/2014 |
| KR | 20140072185 A | 6/2014 |
| KR | 20140072904 A | 6/2014 |
| KR | 20140084024 A | 7/2014 |
| KR | 20140099893 A | 8/2014 |
| KR | 20140110922 A | 9/2014 |
| KR | 20140116704 A | 10/2014 |
| KR | 20140121391 A | 10/2014 |
| KR | 20140121830 A | 10/2014 |
| KR | 20140123001 A | 10/2014 |
| KR | 20140128968 A | 11/2014 |
| KR | 20140136995 A | 12/2014 |
| KR | 20140138300 A | 12/2014 |
| KR | 20140146113 A | 12/2014 |
| KR | 20150009538 A | 1/2015 |
| KR | 20150030197 A | 3/2015 |
| KR | 20150031242 A | 3/2015 |
| KR | 20150035556 A | 4/2015 |
| KR | 20150035760 A | 4/2015 |
| KR | 20150054669 A | 5/2015 |
| KR | 20150055115 A | 5/2015 |
| KR | 20150065231 A | 6/2015 |
| KR | 20150082696 A | 7/2015 |
| KR | 20150086445 A | 7/2015 |
| WO | 2010061724 A1 | 6/2010 |
| WO | 2010122818 A1 | 10/2010 |
| WO | 2010146975 A1 | 12/2010 |
| WO | WO_2013_004006 * | 1/2013 |

OTHER PUBLICATIONS

3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10), pp. 1-276 dated 2010.

* cited by examiner

US 10,085,165 B2

MULTI-CELL SIGNALS IN OFDM WIRELESS NETWORKS

CROSS-REFERENCE TO RELATED APPLICATIONS

This application is a continuation of application Ser. No. 14/620,429, filed Feb. 12, 2015, which is a continuation of application Ser. No. 14/561,300, filed Dec. 5, 2014, now U.S. Pat. No. 9,971,316, which is a continuation of application Ser. No. 14/294,902, filed Jun. 3, 2014, now U.S. Pat. No. 8,908,679, which is a continuation of application Ser. No. 13/624,889, filed Sep. 22, 2012, now U.S. Pat. No. 8,797,966, which claims the benefit of U.S. Provisional Application No. 61/538,683, filed Sep. 23, 2011, which are hereby incorporated by reference in their entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable channel state information transmission in wireless communication systems. Embodiments of the technology disclosed herein may be employed in the technical field of wireless communication systems. More particularly, the embodiments of the technology disclosed herein may relate to enhancing channel state information transmission in wireless communication systems.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
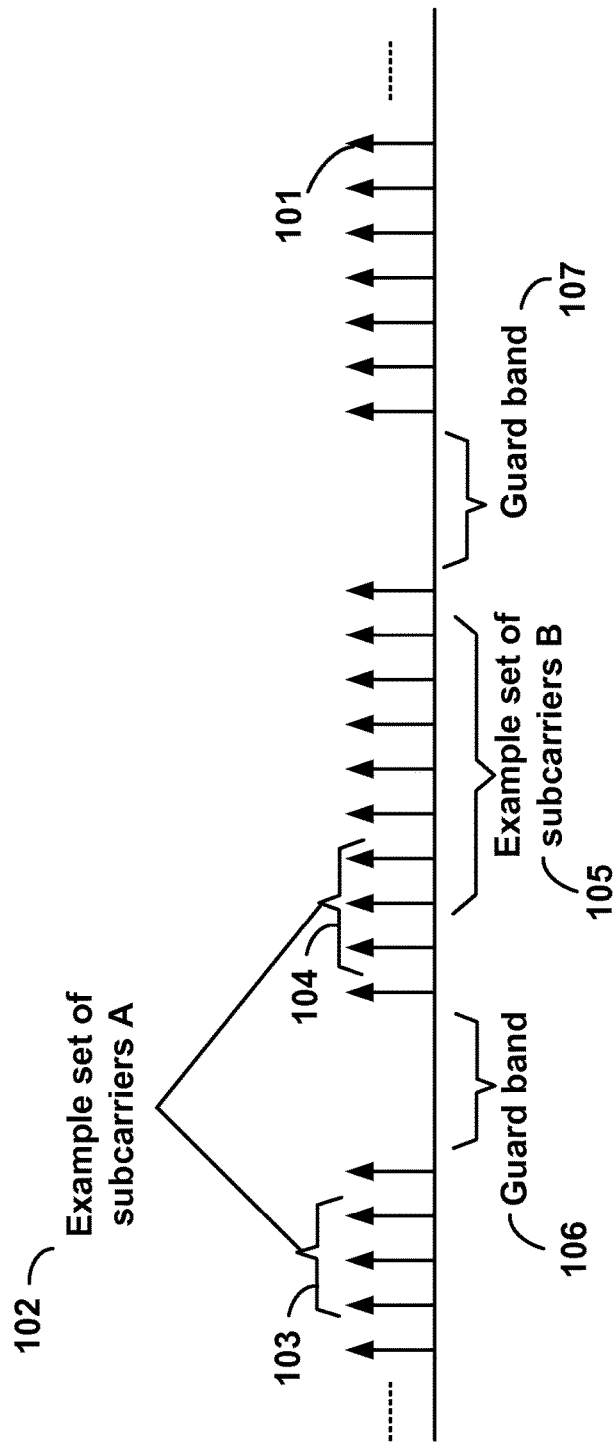
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
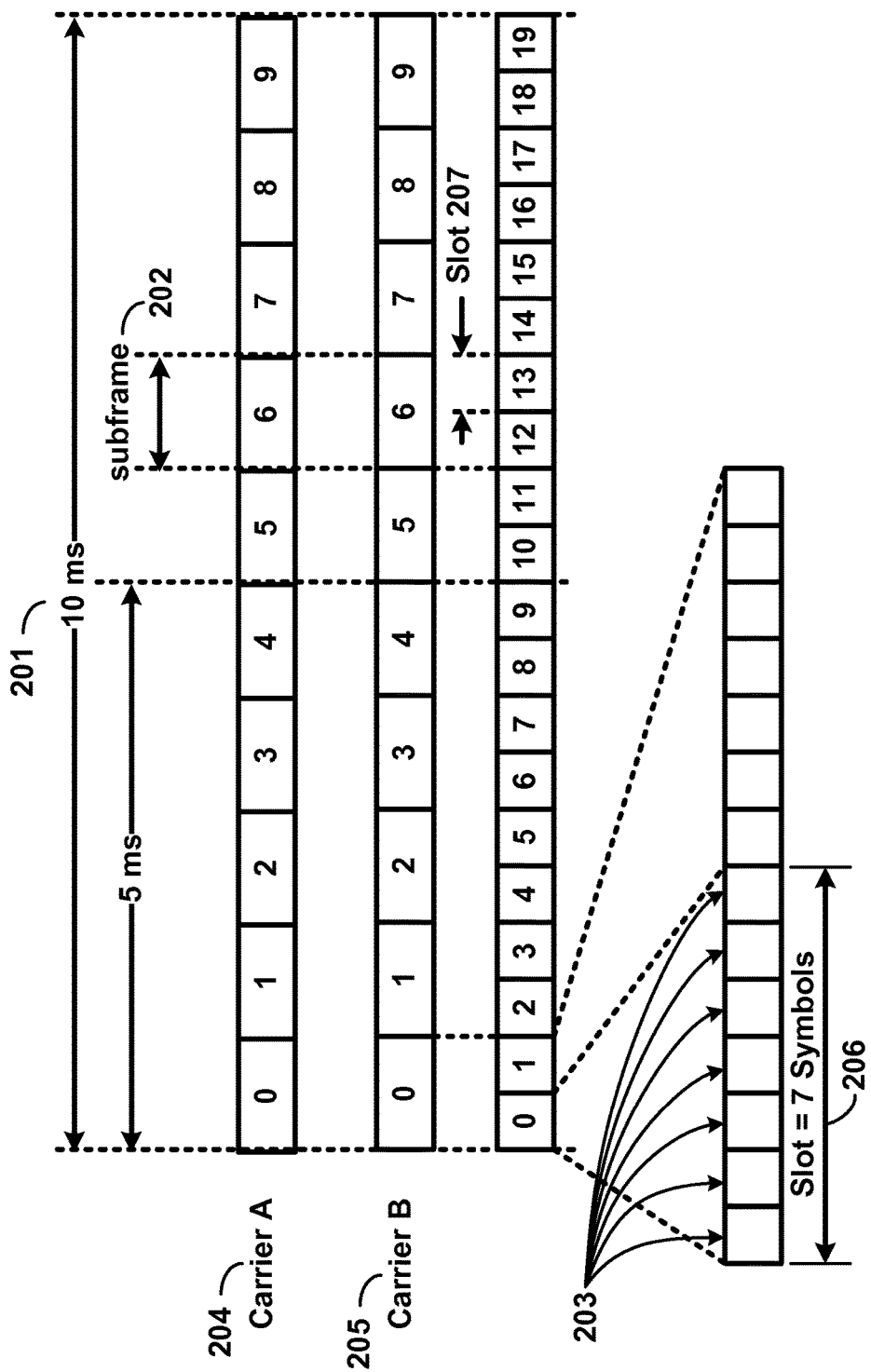
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
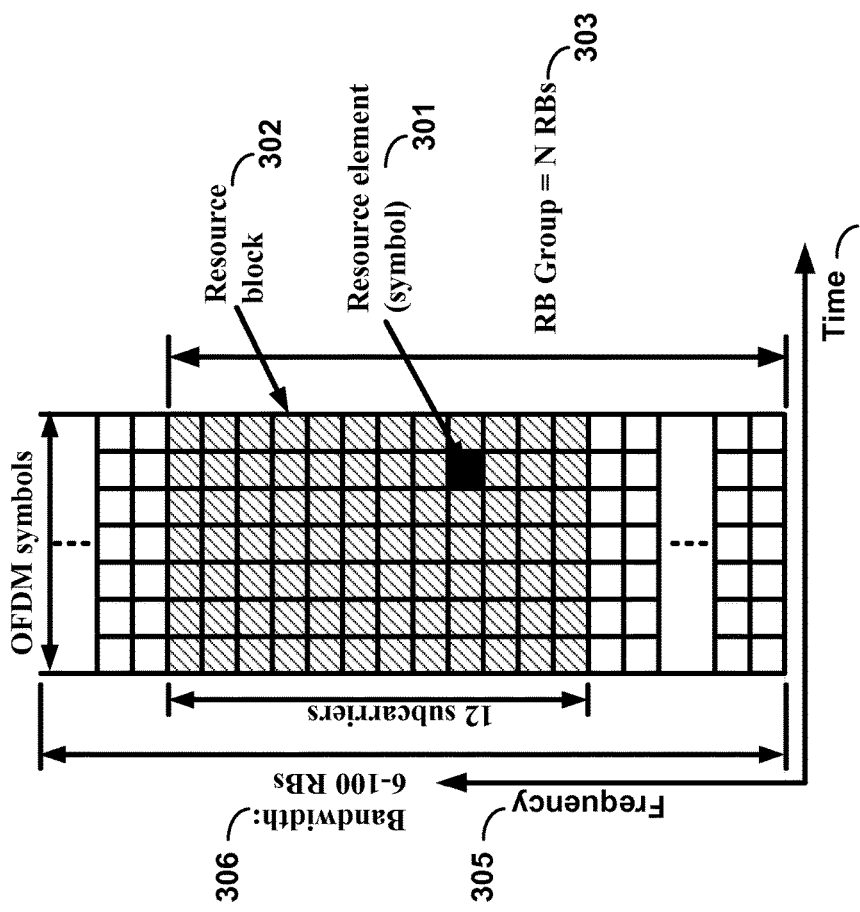
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a pre-defined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
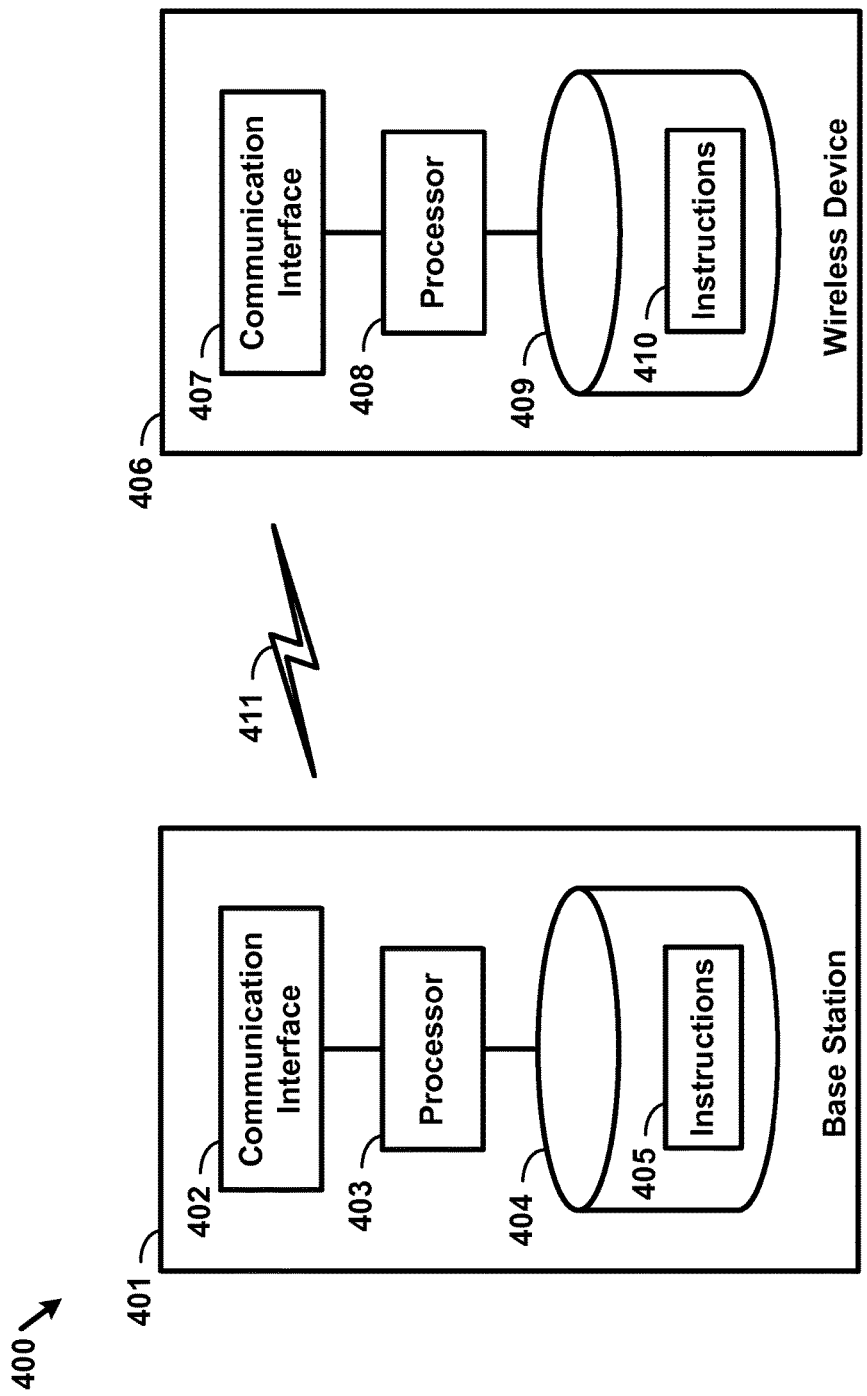
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3, and associated text.

Figure 5:
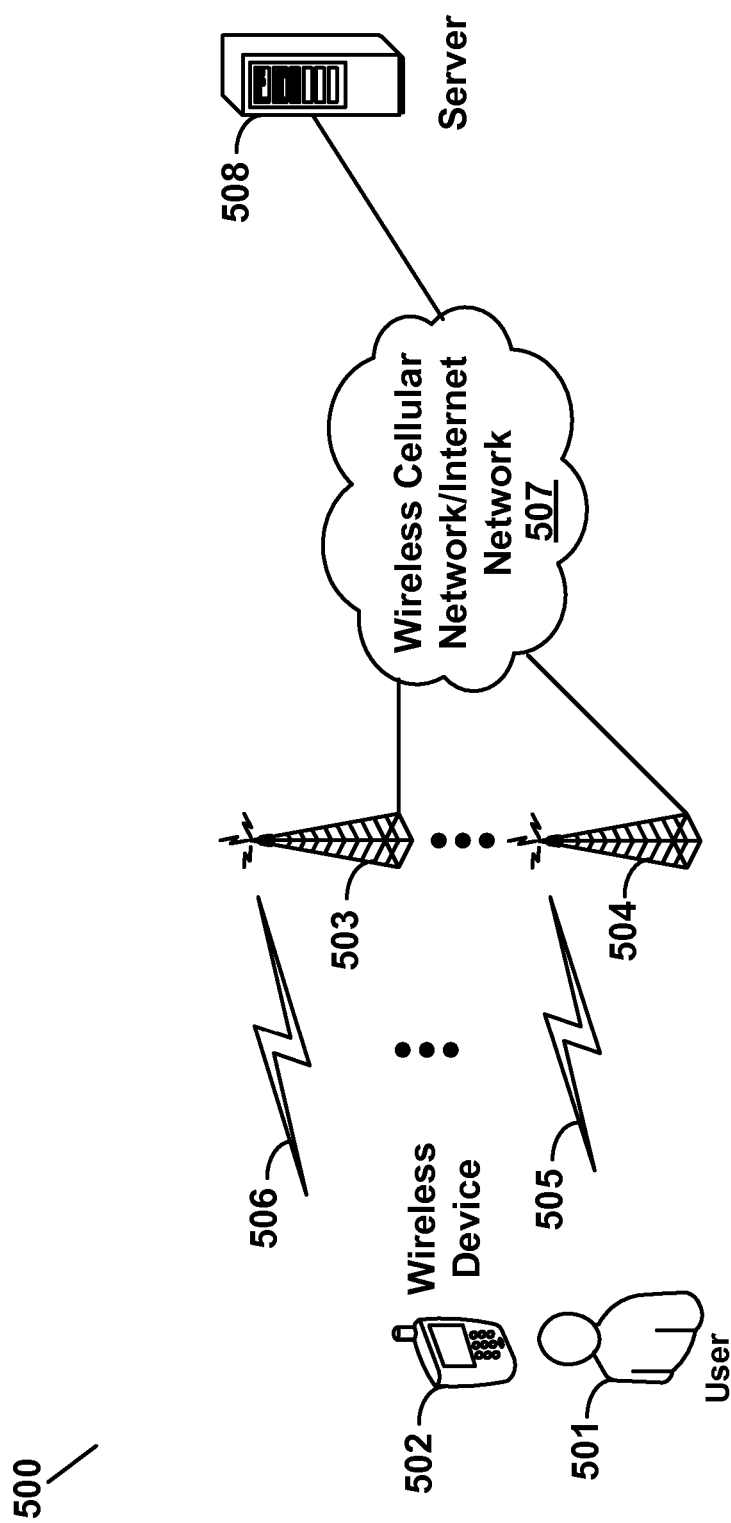
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Coordinated multi-point (CoMP) transmission/reception may be considered for LTE-Advanced as a tool to improve the coverage of high data rates, the cell-edge throughput and/or to increase system throughput. Downlink coordinated multi-point transmission (CoMP) is a relatively general term referring to different types of coordination in the downlink transmission from multiple geographically separated transmission points (TP). This includes coordination in the scheduling, including any beam-forming functionality, between geographically separated transmission points and joint transmission from geographically separated transmissions points.

Downlink coordinated multi-point transmission may include dynamic coordination among multiple geographically separated transmission points. In this context, a serving cell may be the cell transmitting PDCCH assignments (a single cell). There are various CoMP categories including Joint Processing (JP) and Coordinated Scheduling/Beamforming (CS/CB). In Joint Processing (JP) data may be available at each point in CoMP cooperating set. In Joint Transmission, there may be PDSCH transmission from multiple points (part of or entire CoMP cooperating set) at a time. Data to a single wireless device may be simultaneously transmitted from multiple transmission points, e.g. to (coherently or non-coherently) improve the received signal quality and/or cancel actively interference for other wireless devices, dynamic cell selection may be applied, in which PDSCH transmission occurs from one point at a time (within CoMP cooperating set). In Coordinated Scheduling/Beamforming (CS/CB), data may be available at serving cell (data transmission from that point) but user scheduling/beamforming decisions may be made with coordination among cells corresponding to the CoMP cooperating set.

According to some of the various aspects of embodiments, there may be various CoMP sets including CoMP cooperating set and CoMP measurement set. CoMP cooperating set is a Set of (possibly geographically separated) points directly or indirectly participating in PDSCH transmission to wireless device. This set may or may not be transparent to the wireless device. CoMP transmission point(s) are a point or set of points actively transmitting PDSCH to wireless device. CoMP transmission point(s) may be a subset of the CoMP cooperating set. For Joint transmission, the CoMP transmission points may be the points in the CoMP cooperating set. For dynamic cell selection, a single point may be the transmission point at every subframe. This transmission point can change dynamically within the CoMP cooperating set. For coordinated scheduling/beamforming, the CoMP transmission point may correspond to the serving cell. CoMP measurement set may be the set of cells about which channel state/statistical information related to their link to the wireless device is reported as discussed. The CoMP measurement set may be the same as the CoMP cooperating set. The actual wireless device reports may down-select cells for which actual feedback information is transmitted (reported cells). RRM (radio resource management) measurement set may be defined in support of RRM measurements and may not be CoMP specific.

Downlink coordinated multi-point transmission may include the possibility of coordination between different cells. From a radio-interface perspective, the cells may belong to the same base station or different base stations. If inter-base station coordination is supported, information needs to be signaled between base stations. Potential impact on the radio-interface may include these areas: feedback and measurement mechanisms from the wireless device, preprocessing schemes, and reference signal design. Reporting of dynamic channel conditions between the multiple transmission points and the wireless device may be required. For TDD, channel reciprocity may be exploited. Reporting to facilitate the decision on the set of participating transmission points may be needed. For TDD, channel reciprocity may be exploited. Preprocessing schemes may include joint processing prior to transmission of the signal over the multiple transmission points. Downlink control signaling may support various transmission schemes. New forms of feedback and signaling may be needed to support CoMP that are, for example, configured by RRC for a given wireless device. As baseline, the network may not need explicitly signal to the wireless device the CoMP transmission point(s) and the wireless device reception/demodulation of CoMP transmissions (CS/CB, or JP with MBSFN subframes) may be the same as that for non CoMP (SU/MU-MIMO). Any additional feedback designed for CoMP may be consistent with the feedback framework for SU/MU-MIMO.

According to some of the various aspects of embodiments, the three main categories of CoMP feedback mechanisms may include explicit and implicit channel state/statistical information feedback. Explicit channel state/statistical information feedback may be channel as observed by the receiver, without assuming any transmission or receiver processing. Implicit channel state/statistical information feedback may be feedback mechanisms that use hypotheses of different transmission and/or reception processing, e.g., CQI/PMI/RI. Wireless device transmission of SRS (sounding reference signal) may be used for CSI estimation at base station exploiting channel reciprocity. Combinations of full or subset of above three may also be possible.

For the CoMP schemes that require feedback, individual per-cell feedback may be considered as baseline. Complementary inter-cell feedback might be needed. Wireless device CoMP feedback reports may target the serving cell (on UL resources from serving cell) as baseline when X2 interface is available and is adequate for CoMP operation in terms of latency and capacity. In this case, the reception of wireless device reports at cells other than the serving cell is a network implementation choice.

According to some of the various aspects of embodiments, explicit feedback in support of DL CoMP may be characterized by having a channel part and a noise-and-interference part. For each cell in the wireless device's measurement set that is reported in a given subframe, one or several channel properties may be reported. Channel properties may include but are not limited to the following ('i' is the cell index): Channel matrix ($H_i$)—short term (instantaneous), the full matrix $H_i$, or main eigen component(s) of $H_i$. Transmit channel covariance ($R_i$), where $R_i$=(sum{$H_{ij}\dagger H_{ij}$})/J, j=0, 1, 2, . . . , J−1, ('j' is span over time or frequency), the full matrix $R_i$, or main eigen component(s) of $R_i$. Inter-cell channel properties may also be reported. Noise-and-interference part may include Interference outside the cells reported by the wireless device (CoMP transmission points), total receive power (Io) or total received signal covariance matrix, covariance matrix of the noise-and-interference, the full matrix, or main eigen component(s).

Different forms of implicit feedback in support of DL CoMP may include the following areas. The feedback may be based on one or a combination of two or more of the following: Single vs. Multi user MIMO, single cell vs. coordinated transmission, transmit precoder, etc. Within coordinated transmission, single point (CB/CS) vs. multi-point (JP) transmission may be considered. Within joint processing CoMP, subsets of transmission points or subsets of reported cells (Joint Transmission) may be considered. CoMP transmission point(s) may be based on a Dynamic Cell Selection. Transmit precoder (i.e. tx weights) in JP may include multiple single-cell or multi-cell PMI capturing coherent or non-coherent channel across reported cells. Transmit precoder (i.e. transmitter weights) in CB/CS may include single-cell or multiple single-cell PMIs capturing channel from the reported cell(s) to the wireless device. Transmit precoder may be based on or derived from the PMI weight. Other types of feedbacks, e.g. main Multi-cell eigen-component, instead of PMI may be considered. Receive processing (i.e. receiver weights), or interference based on particular transmitter/receiver processing may also be considered.

There may be a need for the wireless device to convey to the network the hypothesis or hypotheses used (explicit signaling of hypothesis to base station). And/or, there may be a semi-static hypothesis configuration e.g. grouping of hypotheses (explicit signaling of hypothesis to the wireless device). And/or, precoded RS may be used to allow wireless device to generate refined CQI/RI feedback.

The PUCCH may be mapped to a control channel resource in the uplink. The CSI may inform the scheduler about the current channel conditions as seen by the wireless device. If MIMO transmission is used, the CSI includes necessary MIMO-related feedback. The HARQ feedback in response to downlink data transmission comprises of a single ACK/NAK bit per transport block in case of non-bundling configuration. PUCCH resources for SR (scheduling request) and CSI reporting may be assigned and revoked through RRC signaling. An SR is not necessarily assigned to wireless devices acquiring synchronization through the RACH (i.e. synchronized wireless devices may or may not have a dedicated SR channel). PUCCH resources for SR and CQI are lost when the wireless device is no longer synchronized. PUCCH may be transmitted on PCell in carrier aggregation. The physical layer may support simultaneous transmission of PUCCH and PUSCH. A wireless device may transmit PUCCH on the primary cell.

According to some of the various aspects of embodiments, the time and frequency resources that can be used by the wireless device to report CSI which may include channel quality indicator (CQI), precoding matrix indicator (PMI), precoding type indicator (PTI), and/or rank indicator (RI) may be controlled by the base station. For spatial multiplexing, the wireless device may determine a RI corresponding to the number of useful transmission layers. For transmit diversity RI is equal to one. A wireless device may be configured with or without PMI/RI reporting by the higher layer parameter. CSI reporting may be periodic or aperiodic.

If the wireless device is configured with more than one serving cell, it may transmit periodic CSI for all activated serving cells as configured by higher layers. If a wireless device is not configured for simultaneous PUSCH and PUCCH transmission, it may transmit periodic CSI reporting on PUCCH in subframes with no PUSCH allocation. If a wireless device is configured for simultaneous PUSCH and PUCCH transmission, it may transmit periodic CSI reporting on PUCCH in subframes with or without PUSCH allocation. If a wireless device is not configured for simultaneous PUSCH and PUCCH transmission, it may transmit periodic CSI reporting on PUSCH of the serving cell, preferably with smallest Serving Cell Index, in subframes with a PUSCH allocation, where the wireless device may use the same PUCCH-based periodic CSI reporting format on PUSCH.

A wireless device may transmit aperiodic CSI reporting on PUSCH. For aperiodic CQI/PMI reporting, RI reporting may be transmitted if the configured CSI feedback type supports RI reporting. In case both periodic and aperiodic CSI reporting would occur in the same subframe, the wireless device may transmit the aperiodic CSI report in that subframe. When reporting RI the wireless device reports a single instance of the number of useful transmission layers.

According to some of the various aspects of embodiments, when reporting PMI the wireless device may report either a single or a multiple PMI reports. Precoding feedback is used for channel dependent codebook based precoding and relies on wireless devices reporting precoding matrix indicator (PMI). The wireless device may report PMI if configured with PMI/RI reporting. The number of RBs (resource blocks) represented by a single wireless device PMI report may be all RBs or a smaller subset of RBs. The number of RBs represented by a single PMI report is semi-statically configured by higher layer signaling. A wireless device may be restricted to report PMI, RI and PTI within a precoder codebook subset configured by higher layer signaling. For a specific precoder codebook and associated transmission mode, the parameter may specify all possible precoder codebook subsets from which the wireless device may assume the base station may be using when the wireless device is configured in the relevant transmission mode. The set of sub-bands (S) a wireless device may evaluate for CQI reporting spans the entire downlink system bandwidth. A sub-band is a set of k contiguous PRBs where k is a function of system bandwidth. The sub-bands may be indexed in the order of increasing frequency and non-increasing sizes starting at the lowest frequency.

A wireless device may perform aperiodic CSI reporting using the PUSCH in subframe n+k on serving cell c, upon decoding in subframe n either: an uplink DCI format, or a Random Access Response Grant, for serving cell c if the respective CSI request field is set to trigger a report and is not reserved. The minimum reporting interval for aperiodic reporting of CQI and PMI and RI may be 1 subframe. The sub-band size for CQI may be the same for transmitter-receiver configurations with and without precoding. A wireless device is semi-statically configured by higher layers to feed back CQI and PMI and corresponding RI on the same PUSCH using a CSI reporting mode.

A wireless device is semi-statically configured by higher layers to periodically feedback different CSI (CQI, PMI, PTI, and/or RI) on the PUCCH. The periodic CSI reporting mode for each serving cell is configured by higher-layer signaling. For the wireless device-selected sub-band CQI, a CQI report in a certain subframe of a certain serving cell describes the channel quality in a particular part or in particular parts of the bandwidth of that serving cell described subsequently as bandwidth part (BP) or parts. The bandwidth parts may be indexed in the order of increasing frequency and non-increasing sizes starting at the lowest frequency.

If the wireless device is configured with more than one serving cell, the wireless device may transmit a CSI report of one serving cell in any given subframe. If the wireless device is not configured for simultaneous PUSCH and PUCCH transmission or, if the wireless device is configured for simultaneous PUSCH and PUCCH transmission and not transmitting PUSCH, in case of collision between CSI and positive SR in a same subframe, CSI may be dropped. A RI report for a serving cell in a periodic reporting mode may be valid for CQI/PMI report for that serving cell on that periodic CSI reporting mode.

Based on an unrestricted observation interval in time and frequency, the wireless device may derive for each CQI value reported in uplink subframe n the highest CQI index between 1 and 15, which satisfies the following condition, or CQI index 0 if CQI index 1 does not satisfy the condition: A single PDSCH transport block with a combination of modulation scheme and transport block size corresponding to the CQI index, and occupying a group of downlink physical resource blocks termed the CSI reference resource, may be received with a transport block error probability not exceeding 0.1.

Physical Uplink Control Channel Transmission:

According to some of the various aspects of embodiments, if the wireless device is configured for a single serving cell and is not configured for simultaneous PUSCH and PUCCH transmissions, then in subframe n uplink control information (UCI) may be transmitted: on PUCCH, if the wireless device is not transmitting on PUSCH, or on PUSCH if the wireless device is transmitting on PUSCH in subframe n unless the PUSCH transmission corresponds to a Random Access Response Grant or a retransmission of the same transport block as part of the contention based random access procedure, in which case UCI may not be transmitted. If the wireless device is configured for a single serving cell and simultaneous PUSCH and PUCCH transmission, then in subframe n UCI may be transmitted on PUCCH, or on PUCCH and PUSCH depending on the wireless device configuration.

If the wireless device is configured with more than one serving cell and is not configured for simultaneous PUSCH and PUCCH transmission, then in subframe n UCI may be transmitted on PUCCH if the wireless device is not transmitting PUSCH; on PUSCH of the serving cell if the UCI includes aperiodic CSI or aperiodic CSI and HARQ-ACK; on primary cell PUSCH if the UCI comprises of periodic CSI and/or HARQ-ACK and if the wireless device is transmitting on the primary cell PUSCH in subframe n unless the primary cell PUSCH transmission corresponds to a Random Access Response Grant or a retransmission of the same transport block as part of the contention based random access procedure, in which case UCI is not transmitted; or on PUSCH of the secondary cell with smallest SCell Index if the UCI comprises of periodic CSI and/or HARQ-ACK and if the wireless device is not transmitting PUSCH on primary cell but is transmitting PUSCH on at least one secondary cell.

If the wireless device is configured with more than one serving cell and simultaneous PUSCH and PUCCH transmission, then in subframe n UCI may be transmitted: on PUCCH if the UCI includes HARQ-ACK and/or SR; on PUCCH if the UCI includes periodic CSI; on PUCCH and primary cell PUSCH if the UCI comprises of HARQ-ACK and periodic CSI and the wireless device is transmitting PUSCH on the primary cell, in which case the HARQ-ACK is transmitted on PUCCH and the periodic CSI is transmitted on PUSCH unless the primary cell PUSCH transmission corresponds to a Random Access Response Grant or a retransmission of the same transport block as part of the contention based random access procedure, in which case periodic CSI is not transmitted; on PUCCH and PUSCH of the secondary cell with the smallest SCell Index if the UCI includes HARQ-ACK and periodic CSI and if the wireless device is not transmitting PUSCH on primary cell but is transmitting PUSCH on at least one secondary cell, in which case, the HARQ-ACK is transmitted on PUCCH and the periodic CSI is transmitted on PUSCH; on PUCCH and PUSCH if the UCI includes HARQ-ACK/HARQ-ACK+SR/positive SR and aperiodic CSI in which case the HARQ-ACK/HARQ-ACK+SR/positive SR is transmitted on PUCCH and the aperiodic CSI is transmitted on PUSCH of the serving cell.

The downlink MIMO channel formed by the T antennas at base station and the R antennas at wireless device may be characterized by an R×T MIMO channel matrix $H_{DL}(k)$ for each subcarrier k. $H_{DL}(k)$ may be expressed as:

$$H_{DL}(k) = \begin{bmatrix} h_{1,1}(k) & h_{1,2}(k) & \ldots & h_{1,T}(k) \\ h_{2,1}(k) & h_{2,2}(k) & \ldots & h_{2,T}(k) \\ \vdots & \vdots & \ddots & \vdots \\ h_{R,1}(k) & h_{R,2}(k) & \ldots & h_{R,T}(k) \end{bmatrix}, \quad \text{Eq. (1)}$$

where entry $h_{i,j}(k)$, for $i=1, \ldots, R$ and $j=1, \ldots, T$, is a complex gain between base station antenna j and wireless device antenna i for subcarrier k. The uplink MIMO channel formed by the R antennas at wireless device and the T antennas at base station may be characterized by a T×R MIMO channel matrix $H_{UL}(k)$ for each subcarrier k. $H_{UL}(k)$ may have the form shown in equation (1). For FDD, the downlink MIMO channel matrix $H_{DL}(k)$ may not be correlated with the uplink MIMO channel matrix $H_{UL}(k)$. The base station may estimate $H_{UL}(k)$ based on the sounding reference signal transmitted by the wireless device. The base station may send precoding matrix indicator (PMI) information obtained from $H_{UL}(k)$ to the wireless device for precoding on the uplink. Similarly, the wireless device may estimate $H_{DL}(k)$ based on the cell-specific reference signal transmitted by the base station. The wireless device may send PMI information obtained from $H_{DL}(k)$ to the base station for precoding on the downlink.

For TDD, the downlink MIMO channel matrix $H_{DL}(k)$ may be correlated with the uplink MIMO channel matrix $H_{UL}(k)$ and may be assumed to be reciprocal of one another, so that $H_{UL}(k)=H_{DL}^T(k)$, where "$T$" denotes a transpose. In this case, the base station may estimate $H_{UL}(k)$ based on the sounding reference signal transmitted by the wireless device. The base station may estimate $H_{DL}(k)$ based on the estimated $H_{UL}(k)$ by assuming channel reciprocity. The base station may then use $H_{DL}(k)$ to obtain PMI information for the downlink. Similarly, the wireless device may estimate $H_{DL}(k)$ based on the cell-specific reference signal transmitted by the base station. The wireless device may estimate $H_{UL}(k)$ based on the estimated $H_{DL}(k)$ by assuming channel reciprocity. The wireless device may then use $H_{UL}(k)$ to obtain PMI information for the uplink.

An overall downlink MIMO channel is composed of the transmit chains for the T antennas at the base station, the downlink MIMO channel, and the receive chains for the R antennas at the wireless device. An overall uplink MIMO channel is composed of the transmit chains for the R antennas at the wireless device, the uplink MIMO channel, and the receive chains for the T antennas at the base station. For FDD, the overall downlink MIMO channel for each link may be estimated based on a reference signal received via that link. For TDD, the overall downlink MIMO channel may not be reciprocal of the overall uplink MIMO channel, even if $H_{UL}(k)=H_{DL}^T(k)$, due to differences between the responses of the transmit and receive chains at the base station and the wireless device. Calibration may be performed to determine a calibration matrix that may be applied (e.g., at the base station) to account for the differences between the responses of the transmit and receive chains at the base station and the wireless device. With the calibration matrix applied, the overall downlink MIMO channel may be assumed to be reciprocal of the overall uplink MIMO channel. For simplicity, the following description assumes that the transmit and receive chains have flat responses, the calculation matrix is an identity matrix I, the overall downlink MIMO channel matrix is $H_{DL}(k)$, the overall uplink MIMO channel matrix is $H_{UL}(k)$, and $H_{UL}(k)=H_{DL}^T(k)$ for TDD.

For both FDD and TDD, the base station may transmit M symbol streams on M layers to the wireless device, where in general $1 \leq M \leq \min\{T, R\}$. The layers may be viewed as spatial channels of a MIMO channel. Similarly, the wireless device may transmit M symbol streams on M layers to the base station. The number of symbol streams to send on the uplink may or may not be equal to the number of symbol streams to send on the downlink. For clarity, data transmission on the downlink is described below.

According to some of the various aspects of embodiments, good performance may be achieved by transmitting data on eigenmodes of a MIMO channel. The eigenmodes may be viewed as orthogonal spatial channels. To transmit data on eigenmodes, the base station may obtain a precoding matrix based on ideal eigen-beamforming or pseudo eigen-beamforming and may then perform precoding with the precoding matrix. The following table summarizes the characteristics of ideal and pseudo eigen-beamforming.

| Beamforming Type | Description |
| --- | --- |
| Ideal eigen-beamforming | Precoding matrix is derived based on a MIMO channel matrix. |
| Pseudo eigen-beamforming | Precoding matrix is derived based on a pseudo-beam matrix. |

For ideal eigen-beamforming, the downlink MIMO channel matrix $H_{DL}(k)$ may be diagonalized with singular value decomposition, as follows:

$$H_{DL}(k) = U(k)\Sigma(k)V^H(k), \quad \text{Eq (2)}$$

where $U(k)$ is an R×R unitary matrix of left eigenvectors of $H_{DL}(k)$,
$V(k)$ is a T×T unitary matrix of right eigenvectors of $H_{DL}(k)$,
$\Sigma(k)$ is an R×T diagonal matrix of singular values of $H_{DL}(k)$, and
"$H$" denotes a Hermitian or conjugate transpose.

A unitary matrix has columns that are orthogonal to one another, and each column has unit power. A diagonal matrix has possible non-zero values along the diagonal and zeros elsewhere. The singular values in $\Sigma(k)$ are indicative of the channel gains of the eigenmodes of $H_{DL}(k)$ obtained via singular value decomposition. Matrix $V(k)$ may also be referred to as an eigen-beam matrix, a beamforming matrix, etc. The eigen-beam matrix $V(k)$ may also be obtained by performing eigenvalue decomposition of a covariance matrix of $H_{DL}(k)$. The eigenvalue decomposition may be expressed as $$H_{DL}^H(k)H_{DL}(k) = V(k)\Lambda(k)V^H(k),$$

where $\Lambda(k) = \Sigma^H(k)\Sigma(k)$ and $\Lambda(k)$ is a diagonal matrix of eigenvalues of $H_{DL}(k)$.

The base station may transmit data on M eigenmodes to the wireless device, where $1 \le M \le \min\{T, R\}$. The number of eigenmodes (M) to use for data transmission may also be referred to as the rank of the data transmission. A precoding matrix $W_{IBF}(k)$ may be formed based on M columns of $V(k)$ for the M eigenmodes. In one design, $W_{IBF}(k)$ may be formed as follows:

$$W_{IBF}(k) = [v_1(k), \ldots, v_M(k)], \quad \text{Eq (3)}$$

where $v_m(k)$ is the column of $V(k)$ for the m-th selected eigenmode, for $m=1, \ldots, M$, and
$W_{IBF}(k)$ is a T×M precoding matrix for ideal eigen-beamforming (IBF).

In another design, a codebook of precoding matrices may be supported. $W_{IBF}(k)$ may be formed based on a preceding matrix in the codebook that most closely matches $V(k)$, e.g., have the closest distance to $V(k)$.

The base station may perform symbol scaling and preceding for ideal eigen-beamforming as follows:

$$x_{IBF}(k) = W_{IBF}(k)G(k)d(k), \quad \text{Eq (4)}$$

where $d(k)$ is an M×1 vector of data symbols to send on subcarrier k,
$G(k)$ is an M×M diagonal matrix of gains for the data symbols, and
$x(k)$ is a T×1 vector of output symbols for subcarrier k.

The wireless device may obtain received symbols from the R antennas, which may be expressed as:

$$\begin{aligned} r(k) &= H_{DL}(k)x_{IBF}(k) + n(k) \\ &= H_{DL}(k)W_{IBF}(k)G(k)d(k) + n(k) \\ &= H_{EDL}(k)d(k) + n(k) \end{aligned} \quad \text{Eq. (5)}$$

where $H_{EDL}(k) = H_{DL}(k)W_{IBF}(k)G(k)$ is an R×M effective MIMO channel matrix for ideal eigen-beamforming,
$r(k)$ is an R×1 vector of received symbols for subcarrier k, and
$n(k)$ is an R×1 vector of noise and interference for subcarrier k.

The noise and interference may have a covariance matrix of $R_{nn}(k) = E\{n(k)n^H(k)\}$, where $E\{\}$ denotes an expectation. The noise and interference may be assumed to be additive white Gaussian noise (AWGN) with a zero mean vector and a covariance matrix of $R_{nn}(k) = \sigma_n^2 I$, where $\sigma_n^2$ is the variance of the noise and interference.

The wireless device may perform MIMO detection based on minimum mean square error (MMSE), zero-forcing equalization, MMSE with successive interference cancellation, or some other MIMO detection technique. For MMSE, the wireless device may derive an M×R detection matrix $M(k)$ for each subcarrier k, as follows:

$$M(k) = D(k)[H_{EHL}^H(k)H_{EDL}(k) + R_{nn}(k)]^{-1}H_{EDL}^H(k), \quad \text{Eq (6)}$$

where $Z(k) = [H_{EHL}^H(k)H_{EDL}(k) + R_{nn}(k)]^{-1} H_{EDL}^H(k) H_{EDL}(k)$, and $D(k) = [\text{diag } Z(k)]^{-1}$ is a diagonal matrix of scaling values to obtain normalized symbol estimates.

The wireless device may perform MIMO detection as follows:

$$\hat{d}(k) = M(k)r(k), \quad \text{Eq (7)}$$

where $\hat{d}(k)$ is an M×1 vector of symbol estimates for subcarrier k. $\hat{d}(k)$ is an estimate of $d(k)$ sent by the base station.

A signal-to-and-noise-and-interference ratio (SINR) for each eigenmode may be expressed as:

$$SINR_m(k) = \frac{z_m(k)}{1 - z_m(k)}, \quad m = 1, \ldots, M \quad \text{Eq. (8)}$$

where $z_m(k)$ is the m-th diagonal element of $Z(k)$, and $SINR_m(k)$ is the SINR of eigenmode m for subcarrier k.

In general, the SINR may be dependent on the MIMO detection technique used by the wireless device. Different MIMO detection techniques may be associated with different equations for computing SINR.

Rank prediction may be performed (e.g., by the wireless device) to determine M eigenmodes to use for data transmission. In one design of rank prediction, an overall throughput may be computed for each possible combination of eigenmodes that can be used for data transmission. For a given eigenmode combination or hypothesis, the available transmit power of $P_{avail}$ may be allocated to the M eigenmodes in that combination based on uniform power allocation, so that $P_m = P_{avail}/M$ and $P_m$ is the transmit power allocated to eigenmode m. The power allocation may also be based on water-filling or some other technique. The gain matrix G(k) may be computed based on the transmit power allocated to the M eigenmodes. The gain matrix G(k) may include a non-zero gain for each selected eigenmode and a zero gain for each unselected eigenmode. The effective MIMO channel matrix $H_{EDL}(k)$ may then be determined based on the MIMO channel matrix $H_{DL}(k)$, the precoding matrix $W_{IBF}(k)$, and the gain matrix G(k). The SINRs of the M eigenmodes may be determined based on the effective MIMO channel matrix $H_{EDL}(k)$ and the noise covariance matrix $R_{nn}(k)$, as described above. The overall throughput for the current hypothesis may then be determined based on the SINRs of the M eigenmodes. The computation described above may be repeated for each possible combination of eigenmodes to obtain an overall throughput for that combination. The combination of eigenmodes with the highest overall throughput may be selected for data transmission.

For downlink transmission, the wireless device may convert the SINR of each of the M eigenmodes to a CQI value based on a predetermined mapping. The wireless device may obtain CQI information for the M eigenmodes, which may comprise (i) a CQI value for each eigenmode or (ii) a CQI for the first eigenmode and a delta CQI for the difference between the CQI values of successive eigenmodes. The wireless device may send the CQI information to the base station. The base station may select a modulation and coding scheme (MCS) for each eigenmode based on the CQI value for that eigenmode.

For pseudo eigen-beamforming, a pseudo-beam matrix may be formed for each subcarrier k, as follows:

$$B(k)=[h_{DL,1}(k), \ldots, h_{DL,R}(k), b_{R+1}(k), \ldots, b_T(k)], \quad \text{Eq (9)}$$

where $h_{DL,i}(k)$ is a T×1 channel vector for wireless device antenna i,
$b_i(k)$ is a T×1 random vector, and
B(k) is a T×T pseudo-beam matrix.

In general, B(k) may be formed with zero or more channel vectors in $H_{DL}(k)$ for zero or more wireless device antennas. Each channel vector $h_{DL,i}(k)$ may correspond to one row of $H_{DL}(k)$. The remaining columns of B(k) may be random vectors, which may be columns of a discrete Fourier transform (DFT) matrix, a Hadamard or Walsh matrix, or some other matrix.

Example embodiments of the invention may enable channel state information transmission in wireless communication systems. Other example embodiments may comprise a non-transitory tangible computer readable media comprising instructions executable by one or more processors to cause to transmit channel state information. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to transmit channel state information. The device may include processors, memory, interfaces, and/or the like. Other example embodiments may comprise communication networks comprising devices such as base stations, wireless devices (or user equipment: UE), servers, switches, antennas, and/or the like.

Figure 6:
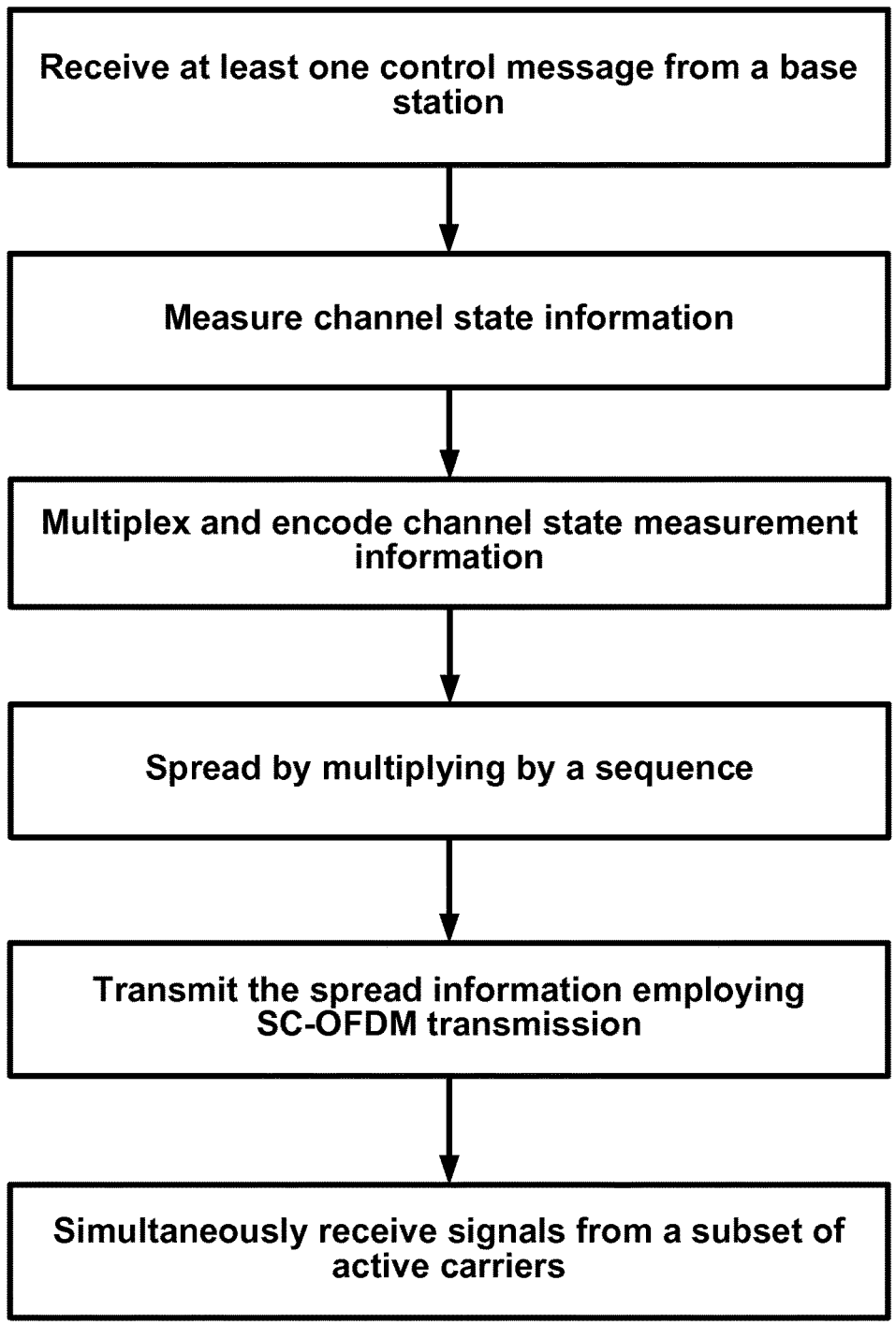
FIG. 6 depicts an example flow chart for channel state information transmission in a wireless device as per an aspect of an embodiment of the present invention.

FIG. 6 depicts an example flow chart for channel state information transmission in a wireless device as per an aspect of an embodiment of the present invention. According to some of the various aspects of embodiments, a wireless device may receive at least one control message from a first base station in the plurality of base stations. The at least one control message may configure measurement parameters of the wireless device. The measurement configuration may trigger measurements of channel state information corresponding to a subset of carriers in the plurality of base stations. The at least one control message may configure at least one of the following: a) a channel state information transmission period, b) a channel state information transmission resource, c) a channel state information measurement resource, d) a physical uplink control channel format, and/or e) a list of carriers for the measurement of channel state information. Carriers in the list of carriers may belong to at least two base stations in the plurality of base stations or may belong to at least two sectors of the first base station.

The wireless device may measure the channel state information for each active carrier in the list of carriers on a plurality of OFDM subcarriers and a first plurality of subframes in the plurality of subframes determined by the measurement resource based on the configuration received in the at least one control message. The wireless device may multiplex and encode the channel state measurement information based on the physical uplink control channel format. The wireless device may spread by multiplying the multiplexed and encoded information by a sequence generated in the wireless device. The wireless device may transmit the spread information using single-carrier OFDM transmission on the channel state information transmission resource according to the channel state information transmission period. The wireless device may simultaneously receive signals from a subset of carriers in the list of carriers. The signals carry a plurality of data packets for the wireless device. Carriers in the subset of carriers may belong to the at least two base stations or may belong to at least two sectors of the first base station.

According to some of the various aspects of embodiments, the at least two base stations may comprise the first base station. The at least one control message may comprise at least one of the following: an RRC Connection Reconfiguration, an RRC connection establishment, and a PDCCH message. For example, the wireless device may transmit the channel state measurement information of only one carrier in a subframe. The wireless device may transmit the channel state measurement information of only one carrier in a subframe, and may alternate transmission of the channel state measurement information of each carrier in the list of carriers in a pre-defined order. The encoded channel state measurement information may comprise information about transmission channel of a plurality of carriers.

The channel state information transmission period may be in terms of number of subframes. The channel state information may comprise at least one of the following: a channel quality indicator (CQI), a precoding matrix indicator (PMI), a precoding type indicator (PTI), and a rank indicator (RI).

The rank indicator may correspond to the number of transmission layers for downlink transmission. The precoding matrix indicator (PMI) may be measured for the entire bandwidth or a group of resource blocks according to the wireless device configuration. The channel quality indicator (CQI) may be measured for the entire bandwidth or a group of resource blocks according to the wireless device configuration. The wireless device may be in connected state and no data packet may be transmitted in physical uplink shared channel simultaneously in a subframe in which the spread information is transmitted. The plurality of OFDM subcarriers of a carrier may comprise reference signal symbols transmitted on the carrier. The first plurality of subframes may not comprise almost blank subframes. The first plurality of subframes may not comprise broadcast and multicast subframes. The measurement resource may determine subband or wideband channel state measurement, wherein the wideband corresponds to a carrier bandwidth. The measurement resource may comprise reference signal in the subband or the wideband. The measurement resource may determine a plurality of resource blocks that are object of the channel state information measurement. The measurement resource may determine a plurality of subframes that are object of the channel state information measurement.

The channel state information may be quantized separately for different carriers in the subset of carriers. The channel state information may be quantized jointly across the subset of carriers. The channel state information may be represented by a product of a first channel state information matrix and a second channel state information matrix. The first channel state information matrix may be global channel state information and may comprise joint information about all active carriers in the subset of carriers. The second channel state information matrix may be local channel state information and may comprise separate information about different active carriers in the subset of carriers. The first channel state information matrix may comprise information about channel eigen values. The second channel state information matrix may comprise information about channel eigen vectors. The first channel state information matrix may be left multiplied by the second channel state information matrix. The first channel state information matrix may be right multiplied by the second channel state information matrix.

The channel state information may be quantized using a multiple description code. The channel state information may be transmitted over a plurality of separate instances of the physical uplink control channel. Each instance in the plurality of separate instances of the physical uplink control channel may carry coarse channel state information. The channel state information may be encoded separately for different carriers. The channel state information may be encoded jointly across the subset of carriers. The channel state information for carriers other than a primary carrier of the wireless device may be encoded differentially with respect to the channel state information for the primary carrier of the wireless device. The differentially encoded channel state information may comprise phase and amplitude information. The differentially encoded channel state information may comprise phase information, and may not comprise amplitude information. The differentially encoded channel state information may comprise amplitude information, and may not comprise phase information. The channel state information may be transmitted using hierarchical modulation. The channel state information may be transmitted using multilevel coding.

The physical uplink control channel format may determine whether any of the following measurements are comprised in the channel state information: a channel quality indicator (CQI), a precoding matrix indicator (PMI), a precoding type indicator (PTI), or a rank indicator (RI). The sequence may be determined based on a temporary identifier assigned to the wireless device by a base station. The channel state information measurement resource may comprise at least an uplink carrier resource block. The physical uplink control channel may be transmitted on an uplink carrier corresponding to a downlink primary carrier. The channel state information may be transmitted on the physical uplink control channel, if there is no transmission on physical uplink shared channel in the same subframe, and the wireless device is not configured to transmit simultaneously on the physical uplink control channel and the physical uplink shared channel. The channel state information may be transmitted on the physical uplink control channel with or without physical uplink shared channel allocation, if the wireless device is configured to transmit simultaneously on the physical uplink control channel and an uplink data channel.

According to some of the various aspects of embodiments, each base station in a plurality of base stations of a network comprises at least one carrier. The wireless device may receive at least one control message from a first base station in the plurality of base stations. The at least one control message may configure measurement parameters of the wireless device. The measurement configuration may trigger measurements of channel state information corresponding to a subset of carriers in the plurality of base stations. The at least one control message may configure at least one of the following: a channel state information transmission period, a channel state information transmission resource, a physical uplink control channel format, and/or a list of carriers for the measurement of channel state information. Carriers in the list of carriers may belong to at least two base stations in the plurality of base stations or may belong to at least two sectors of the first base station in the plurality of base stations. In an example embodiment, the wireless device may measure channel state information only for active configured carriers.

The wireless device may measure the channel state information for each active carrier in the list of carriers based on the configuration received in the at least one control message. The wireless device may multiplex and encode the channel state measurement information based on the physical uplink control channel format. The wireless device may spread by multiplying the multiplexed and encoded information by a sequence generated in the wireless device. The wireless device may transmit the spread information using single-carrier OFDM transmission on the channel state information transmission resource according to the channel state information transmission period. The wireless device may simultaneously receive signals from a subset of active carriers in the list of carriers. The signals may carry a plurality of data packets for the wireless device. Carriers in the subset of carriers may belong to the at least two base stations or may belong to at least two sectors of the first base station.

Figure 7:
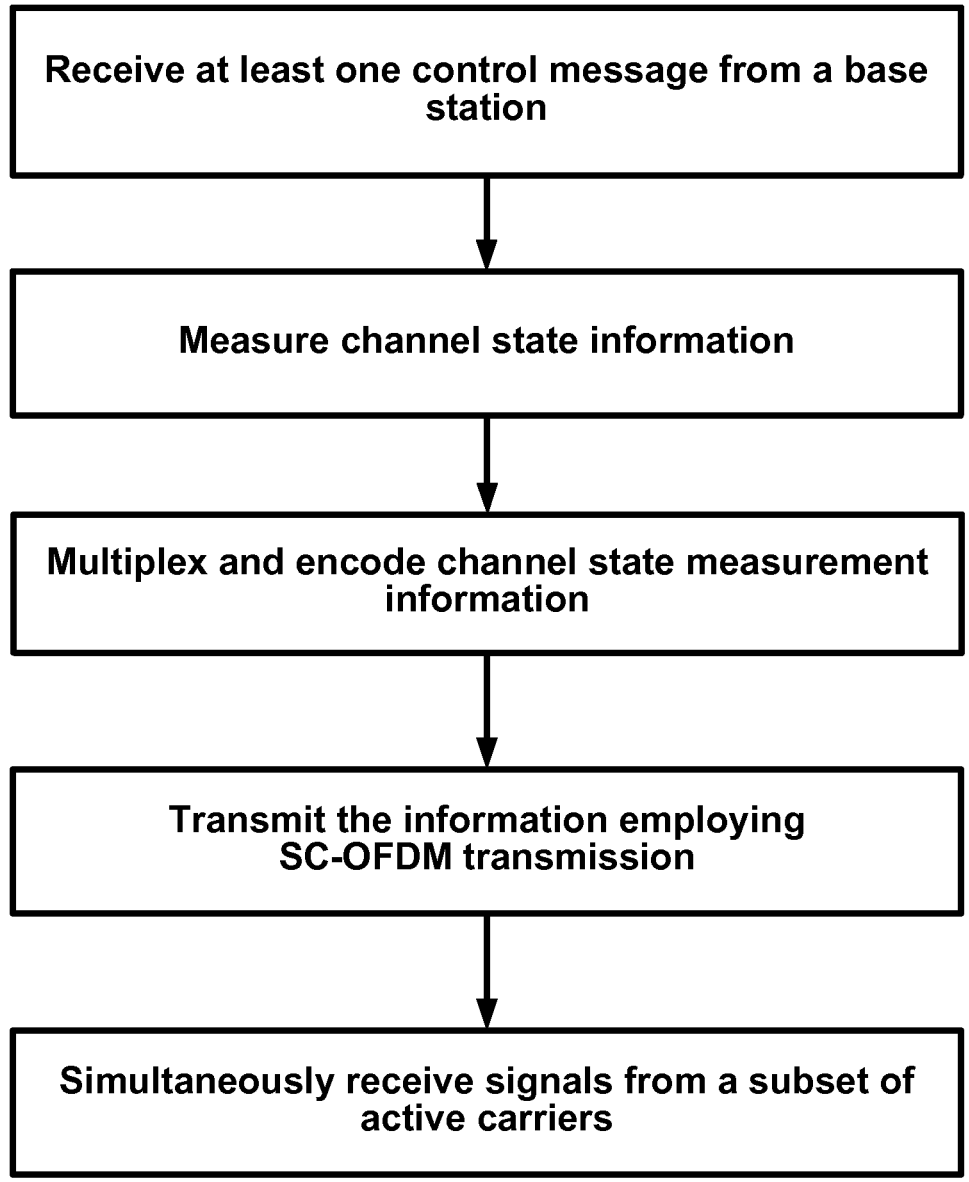
FIG. 7 depicts an example flow chart for channel state information transmission in a wireless device as per an aspect of an embodiment of the present invention.

FIG. 7 depicts an example flow chart for channel state information transmission in a wireless device as per an aspect of an embodiment of the present invention. According to some of the various aspects of embodiments, a network comprises a plurality of base stations. Each base station may comprise at least one carrier. The wireless device may receive at least one control message from a first base station in the plurality of base stations. The at least one control message may configure measurement parameters of the wireless device. The measurement configuration may trigger measurements of channel state information corresponding to a subset of carriers in the plurality of base stations. The at least one control message may configure at least one of the following: an uplink transmission resource, physical uplink channel format, and/or a list of carriers for the measurement of channel state information. Carriers in the list of carriers may belong to at least two base stations in the plurality of base stations or may belong to at least two sectors of the first base station in the plurality of base stations.

The wireless device may measure the channel state information for each active carrier in the list of carriers based on the configuration received in the at least one control message. The wireless device may multiplex and encode the channel state measurement information based on the physical uplink channel format. The wireless device may transmit the information using single-carrier OFDM transmission on the uplink transmission resource. The wireless device may simultaneously receive signals from a subset of active carriers in the list of carriers. The signals may carry a plurality of data packets for the wireless device. Carriers in the subset of carriers may belong to the at least two base stations or may belong to at least two sectors of the first base station.

The at least one control message may comprise RRC messages and PDCCH messages. The physical uplink channel format may determine the format of physical uplink control channel or physical uplink shared channel or both. If the wireless device is not configured for simultaneous transmission on the physical uplink control channel and a physical uplink shared channel, the wireless device may transmit the channel state information on the physical uplink shared channel of a serving cell with smallest Serving Cell Index, in subframes with a physical uplink shared channel allocation. The channel state information may be quantized using a multiple description code. The channel state information may be transmitted over a plurality of separate instances of the physical uplink channel.

According to some of the various aspects of embodiments, a first base station may transmit at least one control message to a wireless device. The at least one control message may configure measurement parameters of the wireless device. The measurement configuration may trigger measurements of channel state information corresponding to a subset of active carriers in the plurality of base stations. The at least one control message may configure at least one of the following: a) a channel state information transmission period, b) a channel state information transmission resource, c) a channel state information measurement resource, d) a physical uplink control channel format, and e) a list of carriers for the measurement of channel state information by the wireless device. Carriers in the list of carriers may belong to at least two base stations in the plurality of base stations or may belong to at least two sectors of the first base station in the plurality of base stations.

The first base station may receive spread information from the wireless device using single-carrier OFDM reception on the channel state information transmission resource according to the channel state information transmission period. The wireless device may measure the channel state information for each carrier in the list of carriers on a plurality of OFDM subcarriers and a first plurality of subframes in the plurality of subframes determined by the measurement resource based on the configuration received in the at least one control message. The wireless device may multiplex and encode the channel state measurement information based on the physical uplink control channel format. The wireless device may spread by multiplying the multiplexed and encoded information by a sequence generated in the wireless device to generate the spread information. Signals may be simultaneously transmitted from a subset of active carriers in the list of carriers. The signals may carry a plurality of data packets for the wireless device. Active carriers in the subset of carriers may belong to the at least two base stations or may belong to at least two sectors of the first base station.

The at least two base stations may comprise the first base station. The at least one control message comprises at least one of the following: a) an RRC Connection Reconfiguration, b) an RRC connection establishment, and c) a PDCCH message. The first base station may receive the channel state measurement information of only one carrier in a subframe. The first base station may receive the channel state measurement information of only one carrier in a subframe. The first base station may alternate reception of the channel state measurement information of each carrier in the list of carriers in a pre-defined order. The encoded channel state measurement information may comprise information about transmission channel of a plurality of carriers. The channel state information transmission period may be in terms of number of subframes. The channel state information may comprise at least one of the following: a) a channel quality indicator (CQI), b) a precoding matrix indicator (PMI), c) a precoding type indicator (PTI), and d) a rank indicator (RI). The rank indicator may correspond to the number of transmission layers for downlink transmission. The precoding matrix indicator (PMI) may be measured by the wireless device for the entire bandwidth or a group of resource blocks according to the wireless device configuration. The channel quality indicator (CQI) is measured by the wireless device for the entire bandwidth or a group of resource blocks according to the wireless device configuration.

The wireless device may be in connected state and no data packet may be received in physical uplink shared channel simultaneously in a subframe in which the spread information is received. The plurality of OFDM subcarriers of a carrier may comprise reference signal symbols transmitted on the carrier. The first plurality of subframes may not comprise almost blank subframes. The first plurality of subframes may not comprise broadcast and multicast subframes. The measurement resource may determine sub-band or wideband channel state measurement. The wideband corresponds to a carrier bandwidth. The measurement resource may comprise reference signal in the sub-band or the wideband. The measurement resource may determine a plurality of resource blocks that are object of the channel state information measurement. The measurement resource may determine a plurality of subframes that are object of the channel state information measurement.

According to some of the various aspects of embodiments, the channel state information may be quantized separately for different carriers in the subset of carriers. The channel state information may be quantized jointly across the subset of carriers. The channel state information may be represented by a product of a first channel state information matrix and a second channel state information matrix. The first channel state information matrix may be global channel state information and may comprise joint information about all carriers in the subset of carriers. The second channel state information matrix may be local channel state information and may comprise separate information about different carriers in the subset of carriers. The first channel state information matrix may comprise information about channel eigen values. The second channel state information matrix may comprise information about channel eigen vectors. The first channel state information matrix may be left multiplied by the second channel state information matrix. The first channel state information matrix may be right multiplied by the second channel state information matrix. The channel state information may be quantized using a multiple description code. The channel state information may be received over a plurality of separate instances of the physical uplink control channel. Instances in the plurality of separate instances of the physical uplink control channel may carry coarse channel state information.

According to some of the various aspects of embodiments, the channel state information may be encoded separately for different carriers. The channel state information may be encoded jointly across the subset of carriers. The channel state information for carriers other than a primary carrier of the wireless device may be encoded differentially with respect to the channel state information for the primary carrier of the wireless device. The differentially encoded channel state information may comprise phase and amplitude information. The differentially encoded channel state information may comprise phase information, and may not comprise amplitude information. The differentially encoded channel state information may comprise amplitude information, and may not comprise phase information. The channel state information may be received using hierarchical demodulation. The channel state information may be received using multilevel decoding. The physical uplink control channel format may determine whether any of the following measurements are comprised in the channel state information: a) a channel quality indicator (CQI), b) a precoding matrix indicator (PMI), c) a precoding type indicator (PTI), and d) a rank indicator (RI). The sequence may be determined based on a temporary identifier assigned to the wireless device by a base station. The channel state information measurement resource may comprise at least an uplink carrier resource block. The physical uplink control channel may be received on an uplink carrier corresponding to a downlink primary carrier. The channel state information may be received on the physical uplink control channel, if there is no reception on physical uplink shared channel in the same subframe from the wireless device, and the first base station is not configured to receive simultaneously on the physical uplink control channel and the physical uplink shared channel from the wireless device. The channel state information may be received on the physical uplink control channel with or without physical uplink shared channel allocation, if the first base station is configured to receive simultaneously on the physical uplink control channel and an uplink data channel from the wireless device.

According to some of the various aspects of embodiments, a first base station may transmit at least one control message to a wireless device. The at least one control message may configure measurement parameters of the wireless device. The measurement configuration may trigger measurements of channel state information corresponding to a subset of active carriers in the plurality of base stations. The at least one control message may configure at least one of the following: a) a channel state information transmission period, b) a channel state information transmission resource, c) a physical uplink control channel format, and, d) a list of carriers for the measurement of channel state information by the wireless device. Carriers in the list of carriers may belong to at least two base stations in the plurality of base stations or may belong to at least two sectors of the first base station in the plurality of base stations. The first base station may receive the spread information from the wireless device using single-carrier OFDM transmission on the channel state information transmission resource according to the channel state information transmission period.

The wireless device may measure the channel state information for each active carrier in the list of carriers based on the configuration received in the at least one control message. The wireless device may multiplex and encode the channel state measurement information based on the physical uplink control channel format. The wireless device may spread by multiplying the multiplexed and encoded information by a sequence generated in the wireless device to generate the spread information. Signals may be simultaneously transmitted from a subset of carriers in the list of carriers. The signals may carry a plurality of data packets for the wireless device. Carriers in the subset of carriers may belong to the at least two base stations or may belong to at least two sectors of the first base station.

According to some of the various aspects of embodiments, a network may comprise a plurality of base stations. Each base station may comprise at least one carrier. The first base station may transmit at least one control message to a wireless device. The at least one control message may configure measurement parameters of the wireless device. The measurement configuration may trigger measurements of channel state information corresponding to a subset of carriers in the plurality of base stations. The at least one control message may configure at least one of the following: a) an uplink transmission resource, b) physical uplink channel format, and c) a list of carriers for the measurement of channel state information by the wireless device. Carriers in the list of carriers may belong to at least two base stations in the plurality of base stations or may belong to at least two sectors of the first base station in the plurality of base stations. The first base station may receive the information from the wireless device using single-carrier OFDM transmission on the uplink transmission resource. The wireless device may measure the channel state information for each active carrier in the list of carriers based on the configuration received in the at least one control message. The wireless device may multiplex and encode the channel state measurement information based on the physical uplink channel format. Signals may be simultaneously transmitted from a subset of carriers in the list of carriers. The signals may carry a plurality of data packets for the wireless device. Carriers in the subset of carriers may belong to the at least two base stations or may belong to at least two sectors of the first base station.

According to some of the various aspects of embodiments, the at least one control message may comprise RRC messages and PDCCH messages. The physical uplink channel format may determine the format of physical uplink control channel or physical uplink shared channel or both. If the base station is not configured for simultaneous reception on a physical uplink control channel and a physical uplink shared channel from the wireless device, the base station may receive the channel state information on the physical uplink shared channel of a serving cell with smallest Serving Cell Index, in subframes with a physical uplink shared channel allocation. The channel state information may be quantized using a multiple description code. The channel state information may be transmitted over a plurality of separate instances of the physical uplink channel.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be {0, 1} or {0, 1, 2, 3}. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) {5}, {7}, {8}, or {7, 8, . . . , v+6}, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula(s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VOIP packets. Fourth, the PDCP may be responsible for in-order delivery of packet(s) and duplicate detection service(s) to upper layer(s) after handover(s). After handover, the source base station may transfer unacknowledged packet(s) to target base station when operating in RLC acknowledged mode (AM). The target base station may forward packet(s) received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for use in a wireless device, the method comprising:
receiving, from a first base station, at least one message indicating channel state information (CSI) measurement resources for each cell of a subset of cells, wherein the subset of cells comprises a first cell associated with the first base station and at least one second cell associated with at least one other base station;
measuring, based on the CSI measurement resources, CSI for the subset of cells;
quantizing the measured CSI jointly across cells of the subset of cells;
transmitting, to the first base station, the jointly quantized CSI;
receiving, from the first base station, at least one resource assignment for at least one packet; and receiving signals simultaneously via the first cell associated with the first base station and the at least one second cell associated with the at least one other base station, wherein the signals correspond to the at least one packet.

2. The method of claim 1, wherein the jointly quantized CSI comprises a precoding matrix indicator calculated for the subset of cells.

3. The method of claim 1, wherein the at least one message comprises:
   a CSI reference signal subframe configuration parameter;
   a CSI reference signal antenna port configuration parameter; and
   a CSI reference signal radio resource configuration parameter.

4. The method of claim 1, wherein the CSI measurement resources determine sub-band or wideband CSI measurement, wherein the wideband CSI measurement corresponds to CSI measurement on a carrier bandwidth.

5. The method of claim 4, wherein the CSI measurement resources comprise reference signals in the sub-band or the wideband.

6. The method of claim 1, wherein a physical uplink control channel format determines whether at least one of the following measurements are comprised in the CSI:
   a channel quality indicator (CQI);
   a precoding matrix indicator (PMI);
   a precoding type indicator (PTI); or
   a rank indicator (RI).

7. The method of claim 1, wherein the at least one resource assignment is received from the first base station on one serving cell of the subset of cells.

8. The method of claim 7, wherein a first CSI measurement resource corresponds to a plurality of resource elements in a plurality of subframes on an antenna port in the subset of cells.

9. A method for use in a first base station, the method comprising:
   transmitting, to a wireless device, at least one message indicating channel state information (CSI) measurement resources for each cell of a subset of cells, wherein the subset of cells comprises a first cell associated with the first base station and at least one second cell associated with at least one other base station;
   receiving and decoding jointly quantized CSI, wherein CSI is measured based on the CSI measurement resources for the subset of cells, and the measured CSI is quantized jointly across cells of the subset of cells to generate the jointly quantized CSI;
   transmitting, to the wireless device, at least one resource assignment for at least one packet; and
   transmitting, via the first cell associated with the first base station, first signals to the wireless device, wherein the first signals correspond to the at least one packet, and wherein second signals corresponding to the at least one packet are transmitted via the at least one second cell associated with the at least one other base station.

10. The method of claim 9, wherein the at least one message comprises:
    a CSI reference signal subframe configuration parameter;
    a CSI reference signal antenna port configuration parameter; and
    a CSI reference signal radio resource configuration parameter.

11. The method of claim 9, wherein the CSI measurement resources determine sub-band or wideband CSI measurement, wherein the wideband CSI measurement corresponds to CSI measurement on a carrier bandwidth.

12. The method of claim 9, wherein a physical uplink control channel format determines whether at least one of the following measurements are comprised in the CSI:
    a channel quality indicator (CQI);
    a precoding matrix indicator (PMI);
    a precoding type indicator (PTI); or
    a rank indicator (RI).

13. The method of claim 9, wherein a first CSI measurement resource corresponds to a plurality of resource elements in a plurality of subframes on an antenna port in the subset of cells.

14. The method of claim 9, wherein the at least one resource assignment is transmitted by the first base station on one serving cell of the subset of cells.

15. A wireless device comprising:
    one or more processors; and
    memory storing instructions that, when executed by the one or more processors, cause the wireless device to:
      receive, from a first base station, at least one message indicating channel state information (CSI) measurement resources for each cell of a subset of cells, wherein the subset of cells comprises a first cell associated with the first base station and at least one second cell associated with at least one other base station;
      measure, based on the CSI measurement resources, CSI for the subset of cells;
      quantize the measured CSI jointly across cells of the subset of cells;
      transmit, to the first base station, the jointly quantized CSI;
      receive, from the first base station, at least one resource assignment for at least one packet; and
      receive signals simultaneously via the first cell associated with the first base station and the at least one second cell associated with the at least one other base station, wherein the signals correspond to the at least one packet.

16. The wireless device of claim 15, wherein the jointly quantized CSI comprises a precoding matrix indicator calculated for the subset of cells.

17. The wireless device of claim 15, wherein the at least one message comprises:
    a CSI reference signal subframe configuration parameter;
    a CSI reference signal antenna port configuration parameter; and
    a CSI reference signal radio resource configuration parameter.

18. The wireless device of claim 15, wherein the CSI measurement resources determine sub-band or wideband CSI measurement, wherein the wideband CSI measurement corresponds to CSI measurement on a carrier bandwidth.

19. The wireless device of claim 18, wherein the CSI measurement resources comprise reference signals in the sub-band or the wideband.

20. The wireless device of claim 15, wherein a physical uplink control channel format determines whether at least one of the following measurements are comprised in the CSI:
    a channel quality indicator (CQI);
    a precoding matrix indicator (PMI);
    a precoding type indicator (PTI); or
    a rank indicator (RI).

21. The wireless device of claim 15, wherein the at least one resource assignment is received from the first base station on one serving cell of the subset of cells.

22. The wireless device of claim 21, wherein a first CSI measurement resource corresponds to a plurality of resource elements in a plurality of subframes on an antenna port in the subset of cells.

23. A first base station comprising:
one or more processors; and
memory storing instructions that, when executed by the one or more processors, cause the first base station to:
transmit, to a wireless device, at least one message indicating channel state information (CSI) measurement resources for each cell of a subset of cells, wherein the subset of cells comprises a first cell associated with the first base station and at least one second cell associated with at least one other base station;
receive and decode jointly quantized CSI, wherein CSI is measured based on the CSI measurement resources for the subset of cells, and the measured CSI is quantized jointly across cells of the subset of cells to generate the jointly quantized CSI;
transmit, to the wireless device, at least one resource assignment for at least one packet; and
transmit, via the first cell associated with the first base station, first signals to the wireless device, wherein the signals correspond to the at least one packet, and wherein second signals corresponding to the at least one packet are transmitted via the at least one second cell associated with the at least one other base station.

24. The first base station of claim 23, wherein the at least one message comprises:
a CSI reference signal subframe configuration parameter;
a CSI reference signal antenna port configuration parameter; and
a CSI reference signal radio resource configuration parameter.

25. The first base station of claim 23, wherein the CSI measurement resources determine sub-band or wideband CSI measurement, wherein the wideband CSI measurement corresponds to CSI measurement on a carrier bandwidth.

26. The first base station of claim 23, wherein a physical uplink control channel format determines whether at least one of the following measurements are comprised in the CSI:
a channel quality indicator (CQI);
a precoding matrix indicator (PMI);
a precoding type indicator (PTI); or
a rank indicator (RI).

27. The first base station of claim 23, wherein a first CSI measurement resource corresponds to a plurality of resource elements in a plurality of subframes on an antenna port in the subset of cells.

28. The first base station of claim 23, wherein the at least one resource assignment is transmitted by the first base station on one serving cell of the subset of cells.

29. A system comprising:
a first base station configured to:
transmit, to a wireless device, at least one message indicating channel state information (CSI) measurement resources for each cell of a subset of cells, wherein the subset of cells comprises a first cell associated with the first base station and at least one second cell associated with at least one other base station;
receive and decode jointly quantized CSI;
transmit, to the wireless device, at least one resource assignment for at least one packet; and
transmit, via the first cell, first signals to the wireless device, wherein the first signals correspond to the at least one packet;
a second base station, of the at least one other base station, configured to:
transmit, via the at least one second cell, second signals to the wireless device, wherein the second signals correspond to the at least one packet; and
the wireless device, configured to:
measure, based on the CSI measurement resources, CSI for the subset of cells;
quantize the measured CSI jointly across cells of the subset of cells;
transmit, to the first base station, the jointly quantized CSI; and
receive the first signals and the second signals simultaneously via the first cell associated with the first base station and the at least one second cell associated with the at least one other base station.

30. The system of claim 29, wherein an instance of the CSI comprises a precoding matrix indicator calculated for the subset of cells.

31. The system of claim 29, wherein the at least one message comprises:
a CSI reference signal subframe configuration parameter;
a CSI reference signal antenna port configuration parameter; and
a CSI reference signal radio resource configuration parameter.

32. The system of claim 29, wherein the at least one message indicates a plurality of subframes for the CSI measurement.

33. The system of claim 29, wherein the CSI measurement resources comprise reference signals in a sub-band or a wideband.

34. The system of claim 29, wherein a physical uplink control channel format determines whether at least one of the following measurements are comprised in the CSI:
a channel quality indicator (CQI);
a precoding matrix indicator (PMI);
a precoding type indicator (PTI); or
a rank indicator (RI).

35. The system of claim 29, wherein a first CSI measurement resource corresponds to a plurality of resource elements in a plurality of subframes on an antenna port in the subset of cells.

36. The system of claim 28, wherein the wireless device is further configured to:
receive, from the first base station, the at least one resource assignment.

* * * * *

UNITED STATES PATENT AND TRADEMARK OFFICE
CERTIFICATE OF CORRECTION

| | | |
|---|---|---|
| PATENT NO. | : 10,085,165 B2 | Page 1 of 1 |
| APPLICATION NO. | : 14/797095 | |
| DATED | : September 25, 2018 | |
| INVENTOR(S) | : Esmael Hejazi Dinan | |

It is certified that error appears in the above-identified patent and that said Letters Patent is hereby corrected as shown below:

In the Specification

Column 1, Line 10:
Delete "9,971,316," and insert --8,971,316,--

Column 29, Line 49:
Delete "Lab VIEWMathScript." and insert --LabVIEWMathScript.--

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*